(12) United States Patent
Bai et al.

(10) Patent No.: US 10,803,746 B2
(45) Date of Patent: Oct. 13, 2020

(54) SYSTEM AND METHOD FOR PROVIDING AN INFRASTRUCTURE BASED SAFETY ALERT ASSOCIATED WITH AT LEAST ONE ROADWAY

(71) Applicant: Honda Motor Co., Ltd., Tokyo (JP)

(72) Inventors: Xue Bai, Novi, MI (US); Ehsan Moradi-Pari, West Bloomfield, MI (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/824,313

(22) Filed: Nov. 28, 2017

(65) Prior Publication Data

US 2019/0164422 A1    May 30, 2019

(51) Int. Cl.
| | | |
|---|---|---|
| *H04Q 9/00* | (2006.01) | |
| *G08G 1/0967* | (2006.01) | |
| *G06N 3/08* | (2006.01) | |
| *G08G 1/0968* | (2006.01) | |
| *G06F 16/29* | (2019.01) | |

(52) U.S. Cl.
CPC ....... *G08G 1/096783* (2013.01); *G06F 16/29* (2019.01); *G06N 3/08* (2013.01); *G08G 1/096888* (2013.01); *H04Q 9/00* (2013.01); *H04Q 2209/40* (2013.01)

(58) Field of Classification Search
CPC ....... G08G 1/096716; G08G 1/096741; G08G 1/096775; G08G 1/20; G08G 1/096783; G08G 1/096888; G01C 21/3415; G01C 21/3691; G07C 5/008; G07C 5/085; G06F 16/29; G06N 3/08
See application file for complete search history.

(56) References Cited

U.S. PATENT DOCUMENTS

| | | | |
|---|---|---|---|
| 8,903,640 B2 | 12/2014 | Caminiti et al. | |
| 8,976,041 B2 | 3/2015 | Buckel | |
| 9,418,546 B1 | 8/2016 | Whiting et al. | |
| 9,424,749 B1* | 8/2016 | Reed | G08G 1/07 |
| 9,558,666 B2 | 1/2017 | Jansson et al. | |
| 9,715,829 B2 | 7/2017 | Buchholz et al. | |
| 9,779,621 B1 | 10/2017 | Urmson et al. | |
| 10,235,882 B1 | 3/2019 | Aoude et al. | |

(Continued)

FOREIGN PATENT DOCUMENTS

CN    105788365    7/2016

OTHER PUBLICATIONS

Internet site: United States Department of Transportation, https://www.its.dot.gov/research_archives/cicas/.

(Continued)

*Primary Examiner* — Hai Phan
*Assistant Examiner* — Anthony D Afrifa-Kyei
(74) *Attorney, Agent, or Firm* — Rankin, Hill & Clark LLP

(57) ABSTRACT

A system and method for providing an infrastructure based safety alert associated with at least one roadway that include identifying road users located within a surrounding environment of the at least one roadway. The system and method also include determining road user related data and roadway related data. The system and method additionally include processing roadway behavioral data associated with a non-equipped vehicle. The system and method further include providing a roadway safety alert based on the roadway behavioral data.

20 Claims, 7 Drawing Sheets

(56) References Cited

U.S. PATENT DOCUMENTS

| | | | |
|---|---|---|---|
| 10,386,192 B1* | 8/2019 | Konrardy | G01C 21/3453 |
| 2002/0044690 A1 | 4/2002 | Burgess | |
| 2007/0276600 A1 | 11/2007 | King et al. | |
| 2011/0298603 A1 | 12/2011 | King et al. | |
| 2014/0195138 A1 | 7/2014 | Stelzig et al. | |
| 2015/0266455 A1* | 9/2015 | Wilson | B60W 30/10 |
| | | | 701/93 |
| 2015/0310738 A1 | 10/2015 | Karacan et al. | |
| 2016/0055745 A1 | 2/2016 | Karacan et al. | |
| 2017/0053192 A1 | 2/2017 | Ding et al. | |
| 2017/0300767 A1* | 10/2017 | Zou | G06K 9/00791 |
| 2017/0327035 A1 | 11/2017 | Keiser | |
| 2017/0369055 A1* | 12/2017 | Saigusa | G08G 1/0116 |
| 2018/0096595 A1* | 4/2018 | Janzen | G08G 1/0175 |
| 2018/0293884 A1 | 10/2018 | Liu et al. | |
| 2019/0057606 A1 | 2/2019 | Skvarce | |
| 2019/0066490 A1 | 2/2019 | Skvarce | |
| 2019/0080607 A1 | 3/2019 | McClain et al. | |
| 2019/0102840 A1* | 4/2019 | Perl | G06N 3/08 |

OTHER PUBLICATIONS

L. Le et al., 13th Int. Forum on Advanced Microsystems for Automotive Applications (AMAA 2009) Berlin, Germany, May 2009, http://festag-net.de/doc/2009_AMAA.pdf.

Office Action of U.S. Appl. No. 16/548,764 dated Feb. 19, 2020, 20 pages.

Office Action of U.S. Appl. No. 16/548,764 dated Jul. 8, 2020, 19 pages.

* cited by examiner

SYSTEM AND METHOD FOR PROVIDING AN INFRASTRUCTURE BASED SAFETY ALERT ASSOCIATED WITH AT LEAST ONE ROADWAY

BACKGROUND

Generally, one or more roadways that may include intersections and/or on/off ramps may present an increased risk of possible collision between a vehicle and other road users such as other vehicles and/or pedestrians. In some situations, vehicle to vehicle communications may be utilized to communicate the existence of the other road users to make a driver aware of their existence at or near an intersection and/or on/off ramp from one or more directions. However, vehicle to vehicle communications may only be useful to provide information with regards to vehicles that are equipped to communicate via a vehicle-to-vehicle (V2V) communications protocol. Consequently, vehicles that may not be equipped to communicate via the V2V communications protocol may not be able to send or receive such communications to allow a driver of a V2V equipped vehicle to be made aware of their existence at or near the intersection and/or on/off ramp. For example, a non-V2V equipped vehicle may approach an intersection at a high rate of speed in a certain direction that may be unbeknownst to the driver of a V2V equipped vehicle who may not be aware of its existence based on the inability to communicate information directly between the non-V2V equipped vehicle and the V2V equipped vehicle.

BRIEF DESCRIPTION

According to one aspect, a computer-implemented method for providing an infrastructure based safety alert associated with at least one roadway that includes identifying road users within a surrounding environment of the at least one roadway. The road users include a vehicle communication equipped vehicle (equipped vehicle), a non-vehicle communication equipped vehicle (non-equipped vehicle), and a non-vehicular road user. The computer-implemented method also includes determining road user related data and roadway related data. The road user related data is associated with the non-equipped vehicle and the roadway related data is associated with a birds-eye overhead view of the surrounding environment of the at least one roadway. The computer-implemented method additionally includes processing roadway behavioral data associated with the non-equipped vehicle. The roadway behavioral data is based on the road user related data and the roadway related data. The computer-implemented method further includes providing a roadway safety alert based on the roadway behavioral data. The roadway safety alert is provided to the equipped vehicle to provide information associated with the roadway related data associated with the surrounding environment of the at least one roadway and the road user related data associated with the non-equipped vehicle.

According to another aspect, a system for providing an infrastructure based safety alert associated with at least one roadway that includes a memory storing instructions when executed by a processor cause the processor to identify road users within a surrounding environment of the at least one roadway. The road users include a vehicle communication equipped vehicle (equipped vehicle), a non-vehicle communication equipped vehicle (non-equipped vehicle), and a non-vehicular road user. The instructions also cause the processor to determine road user related data and roadway related data. The road user related data is associated with the non-equipped vehicle and the roadway related data is associated with a birds-eye overhead view of the surrounding environment of the at least one roadway. The instructions additionally cause the processor to process roadway behavioral data associated with the non-equipped vehicle. The roadway behavioral data is based on the road user related data and the roadway related data. The instructions further cause the processor to provide a roadway safety alert based on the roadway behavioral data. The roadway safety alert is provided to the equipped vehicle to provide information associated with the roadway related data associated with the surrounding environment of the at least one roadway and the road user related data associated with the non-equipped vehicle.

According to still another aspect, a computer readable storage medium storing instructions that when executed by a computer, which includes at least a processor, causes the computer to perform a method that includes identifying road users within a surrounding environment of at least one roadway. The road users include a vehicle communication equipped vehicle (equipped vehicle), a non-vehicle communication equipped vehicle (non-equipped vehicle), and a non-vehicular road user. The instructions also include determining road user related data and roadway related data. The road user related data is associated with the non-equipped vehicle and the roadway related data is associated with a birds-eye overhead view of the surrounding environment of the at least one roadway. The instructions additionally include processing roadway behavioral data associated with the non-equipped vehicle. The roadway behavioral data is based on the road user related data and the roadway related data. The instructions further include providing a roadway safety alert based on the roadway behavioral data. The roadway safety alert is provided to the equipped vehicle to provide information associated with the roadway related data associated with the surrounding environment of the at least one roadway and the road user related data associated with the non-equipped vehicle.

DETAILED DESCRIPTION

Figure 1:
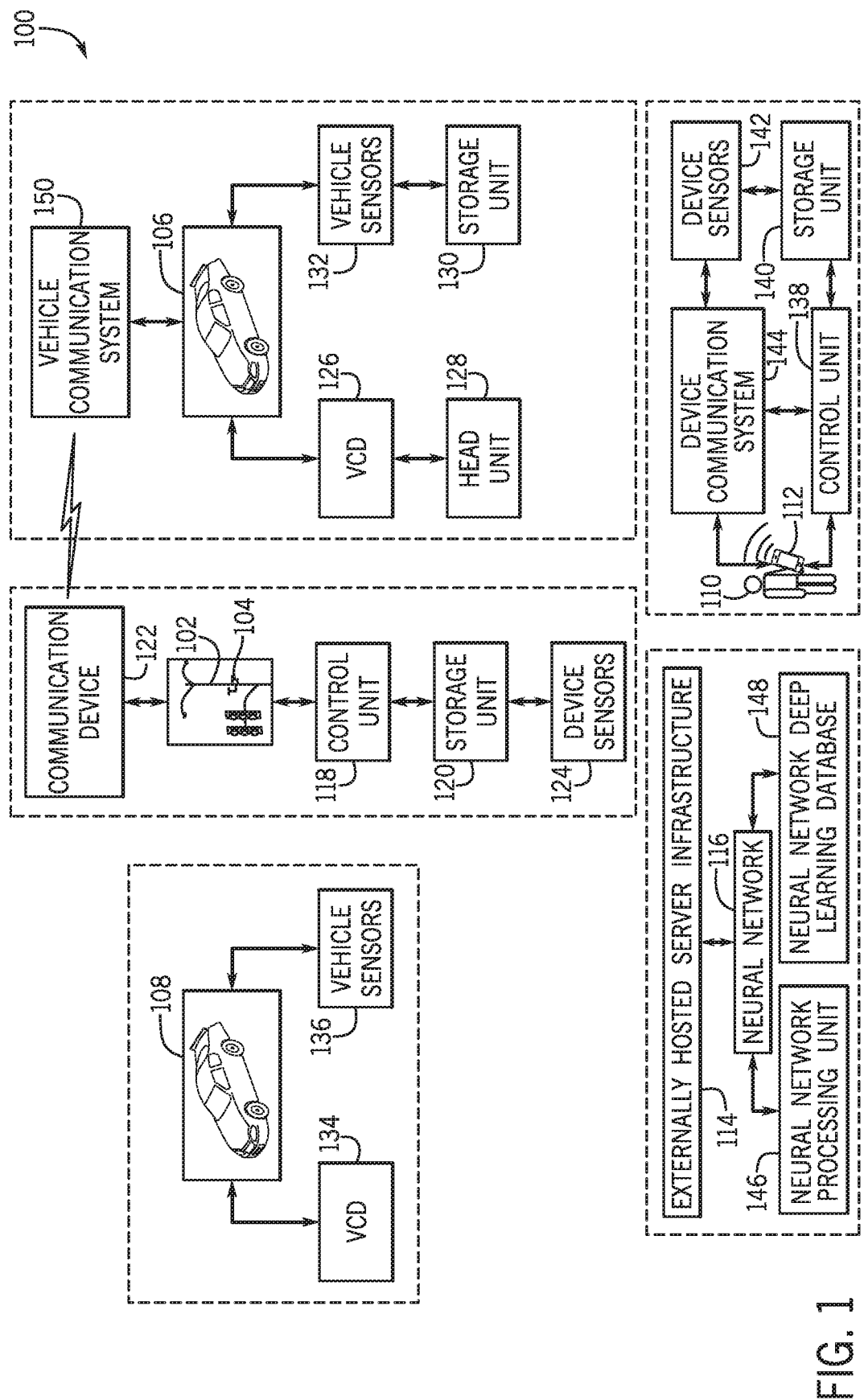
FIG. 1 is a schematic view of an operating environment for implementing systems and methods for providing an infrastructure based safety alert associated with at least one roadway according to an exemplary embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware based controls, interfaces, touch screens, touch pads or plug and play devices. An "output device" includes, but is not limited to: display devices, and other devices for outputting information and functions.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Portable device", as used herein, is a computing device typically having a display screen with user input (e.g., touch, keyboard) and a processor for computing. Portable devices include, but are not limited to, handheld devices, mobile devices, smart phones, laptops, tablets and e-readers. The portable device may additionally include a wearable computing device that includes, but is not limited to, a computing device component (e.g., a processor) with circuitry that can be worn by and/or in possession of a user. Exemplary wearable computing devices can include, but are not limited to, watches, glasses, clothing, gloves, hats, shirts, jewelry, rings, earrings necklaces, armbands, shoes, earbuds, headphones and personal wellness devices.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle display", as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

"Vehicle System" as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

I. System Overview

The systems and methods described herein are generally directed to determining road user related data by sensing and classifying one or more road users and determining attributes related to the one or more road users. The one or more road users may be located within a surrounding environment of at least one roadway. For example, the one or more road users may be located in and traveling through an environment in proximity to a traffic intersection, an on-ramp, an off-ramp, a traffic circle, a highway, a byway, a parking lot, and other types of roadways. The systems and methods described herein are also generally directed to determining roadway related data by sensing and determining attributes that are related to the surrounding environment of the at least one roadway. Additionally, the systems and methods described herein are generally directed to the processing roadway behavioral data of the one or more road users that may be used to provide a roadway safety alert to one or more of the road users located within the surrounding environment of the at least one roadway.

The vehicle communication described herein may be implemented using a vehicle-to-vehicle (V2V) communications protocol, a vehicle-to-infrastructure (V2I) communications protocol, and/or a vehicle-to-everything (V2X) communications protocol. In some embodiments, the vehicle communication may be implemented using Dedicated Short Range Communications (DSRC). Additionally, wireless communications described herein may be implemented with any communication or network protocol, for example, ad hoc networks, wireless access within the vehicle, cellular networks, Wi-Fi networks (e.g., IEEE 802.11), Bluetooth®, long range Bluetooth®, among others.

Referring now to the drawings, wherein the showings are for purposes of illustrating one or more exemplary embodiments and not for purposes of limiting same, FIG. 1 is a schematic view of an operating environment 100 for implementing systems and methods for providing an infrastructure based safety alert associated with at least one roadway according to an exemplary embodiment. The components of the environment 100, as well as the components of other systems, hardware architectures, and software architectures discussed herein, may be combined, omitted, or organized into different architectures for various embodiments.

Generally, the environment 100 may include a roadway infrastructure 102 that is operably connected to a road side equipment unit (RSE) 104 that may be used to sense and classify one or more road users that are located within the surrounding environment of at least one roadway. In one embodiment, the one or more road users may include one or more fully or partially communication equipped vehicles (equipped vehicle(s)) 106, one or more non-communication equipped vehicles (non-equipped vehicle(s) 108, and one or more non-vehicular road users (NVRU(s)) 110.

In particular, the NVRU(s) 110 may include, but may not be limited to, walking pedestrians, running pedestrians, bicyclists, wheel chair users, and the like. In other words, the NVRU(s) 110 may include an individual(s) traveling on foot in one or more manners, or individual(s) travelling using a mobility device, for example, a bike, roller skates, a skateboard, a scooter, a stroller, a wheelchair, and an electric scooter. The equipped vehicle(s) 106 may be configured to send and receive data (e.g., vehicle dynamics data, vehicle sensor data) via one or more vehicle communications protocols and/or one or more wireless communications protocols. In particular, the equipped vehicle(s) 106 may be configured to send and receive data via the V2V communications protocol to additional communication equipped vehicles (not shown) that are located within a vicinity of the equipped vehicle(s) 106.

In some embodiments, the equipped vehicle(s) 106 may be configured to partially communicate through the vehicle communications network and/or through the wireless communications network. In particular, the equipped vehicle(s) 106 may be configured to communicate via the V2I communications protocol. However, in some configurations the equipped vehicle(s) 106 may not be configured to communicate via the V2V communications protocol and consequently may not directly communicate with additional equipped vehicle(s) (not shown) through the V2V communications protocol.

In an exemplary embodiment, the equipped vehicle(s) 106 may be configured to send and receive data with the RSE 104 via the V2I communications protocol to provide data to the RSE 104 and receive data from the RSE 104. Additionally, the equipped vehicle(s) 106 may be configured to send and receive data to an externally hosted server infrastructure 114 and/or one or more additional components of the environment 100 though an internet cloud (not shown) via one or more wireless communications protocols.

In one or more embodiments, the non-equipped vehicle(s) 108 may not be configured to provide external communications via the vehicles communications network and/or the wireless communications network. In particular, the non-equipped vehicle(s) 108 may not be configured communicate directly with the equipped vehicle(s) 106, portable device(s) 112 used by the NVRU(s) 110 (e.g., portable devices in possession of and/or being used by the NVRU(s) 110), and/or the RSE 104. Additionally the non-equipped vehicle(s) 108 may not be configured to communicate through the internet cloud. As discussed below, the RSE 104 may be utilized to process roadway behavioral data associated with the non-equipped vehicle(s) 108 and the (e.g., relative to) equipped vehicle(s) 106 to provide the roadway safety alert to the equipped vehicle(s) 106 to provide information associated with a surrounding environment of at least one roadway and road user data associated with the non-equipped vehicle(s) 108. In additional embodiments, the RSE 104 may be utilized to process roadway behavioral data associated with additional equipped vehicle(s) 106, non-equipped vehicle(s) 108 and the NVRU(s) 110 to provide information associated with the surrounding environment of at least one roadway and road user related data associated with the road users 106, 108, 110 to the equipped vehicle(s) 106 and/or the NVRU(s) 110 through the portable device(s) 112.

In an exemplary embodiment, the RSE 104 may be configured to communicate via one or more communications mediums (discussed below) with the equipped vehicle(s) 106 and the portable device(s) 112 used by the NVRU(s) 110. The RSE 104 may additionally be configured to communicate with the externally hosted server infrastructure 114 through an internet cloud (not shown) and/or directly through one or more wireless communications protocols to send and receive data to and from a neural network 116 that may be utilized to classify the equipped vehicle(s) 106, the non-equipped vehicle(s) 108, and/or the NVRU(s) 110 based on their presence within the surrounding environment of the at least one roadway at which the roadway infrastructure 102 is located. The externally hosted server infrastructure 114 may include a wireless communications device (not shown) that may be configured to access the internet cloud and/or directly communicate with the RSE 104, the equipped vehicle(s) 106 and/or the portable device(s) 112 through wireless communication protocols.

Figure 2:
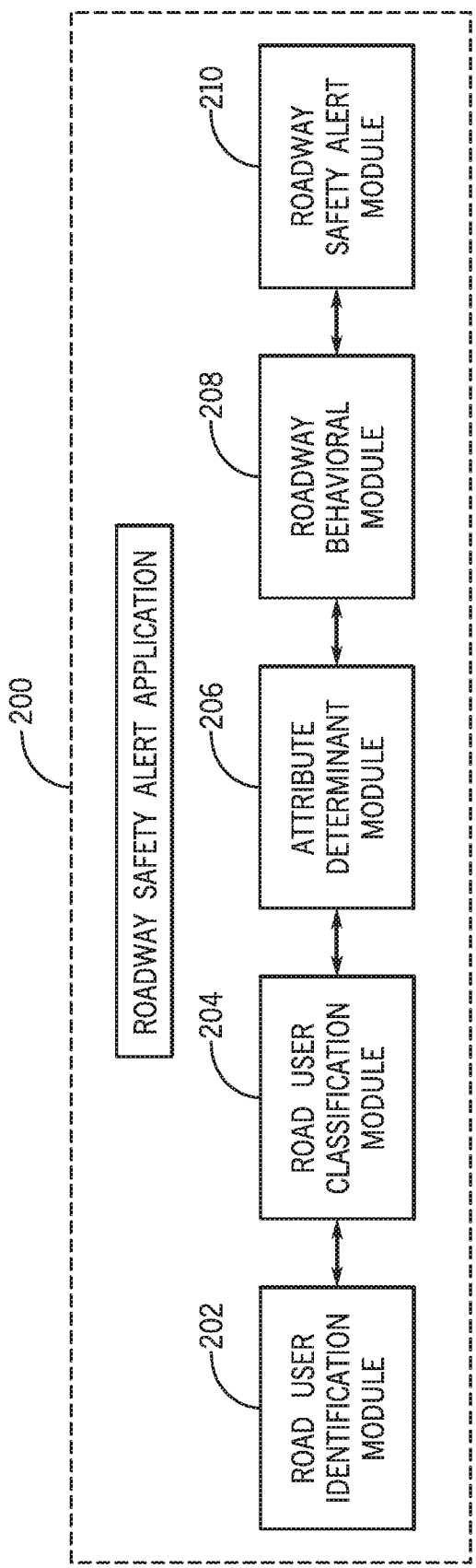
FIG. 2 is a schematic view of a roadway safety alert application according to an exemplary embodiment.

With reference to FIG. 1 and FIG. 2, the RSE 104, the equipped vehicle(s) 106, the portable device(s) 112, and/or the externally hosted server infrastructure 114 may store and/or execute a roadway safety alert application 200. The application 200 may provide a roadway safety alert (e.g., warning, notification, action) that may be communicated or provided locally to the equipped vehicle(s) 106 to provide an alert based on the road user related data associated with at least one of the road users 106, 108, 110 and the roadway related data associated with the surrounding environment of the at least one roadway. In one or more embodiments, the application 200 may also provide the roadway safety alert that may be communicated or provided locally to the NVRU(s) 110 through the respective portable device(s) 112 to provide the alert based on the road user related data associated with at least one of the road users 106, 108 and the roadway related data associated with the surrounding environment of the at least one roadway.

The roadway safety alert application 200 may generally analyze sensor data provided by the RSE 104, the equipped vehicle(s) 106, and/or the portable device(s) 112 and may process a roadway behavioral map that includes road user related data associated with the road user(s) 106, 108, 110 identified within the surrounding environment of the at least one roadway and roadway related data associated with the surrounding environment of the at least one roadway. In one or more embodiments, upon processing the roadway behavioral map, the application 200 may process roadway behavioral data based on the road user related data and the roadway related data associated with the road user(s) 106, 108, 110 included within the roadway behavioral map. In one embodiment, the application 200 may provide the roadway safety alert that may be based on the roadway behavioral data associated with the non-equipped vehicle(s) 108, the NVRU(s) 110, and/or additional equipped vehicle(s) identified by the application 200 as being located within the surrounding environment of the at least one roadway to the equipped vehicle(s) 106.

In one or more embodiments, the roadway safety alert may be provided as a visual or audio warning/alert to a driver(s) of the equipped vehicle(s) 106. Additionally the roadway safety alert may be provided in a similar manner to the NVRU(s) 110 through the portable device(s) 112. In some embodiments, the roadway safety alert may also be provided in the form of an autonomous driving response (e.g., automatic braking) that may be provided to manipulate the operation of the equipped vehicle(s) 106 based on the roadway behavioral data associated with the non-equipped vehicle(s) 108, the NVRU(s) 110, and/or additional equipped vehicle(s).

The roadway safety alert may provide the driver(s) of the equipped vehicle(s) 106 with information associated with the roadway related data and the road user related data associated with the non-equipped vehicle(s) 108, one or more additional equipped vehicles, and/or the NVRU(s) 110 located within the surrounding environment of the at least one roadway. With respect to the NVRU(s) 110 located within the surrounding environment of the at least one roadway, the roadway safety alert may provide the NVRU(s) 110 with information associated with the roadway related data and the road user related data associated with the equipped vehicle(s) 106 and/or the non-equipped vehicle(s) 108 located within the surrounding environment of the at least one roadway.

Referring again to the roadway infrastructure 102 of FIG. 1, the roadway infrastructure 102 is located within the surrounding environment of the at least one roadway. The roadway infrastructure 102 may include, but may not be limited to one or more street lights, traffic lights, road signs, and the like that are located within the surrounding environment of the at least one roadway (e.g., at or near an intersection, on/off ramp). In some embodiments, the roadway infrastructure 102 may also include infrastructure that may be located near a vicinity of the at least one roadway (e.g., cellular towers, buildings, utility poles, bridges, tunnels, and the like).

The RSE 104 may be physically connected to or may be included as part of the roadway infrastructure 102 and may be configured to capture/sense a birds-eye/overhead view of the surrounding environment of the at least one roadway, that may be output as sensor data that applies to the surrounding environment of the at least one roadway. In one embodiment, the RSE 104 may include a control unit 118 that may process and compute functions associated with the components of the RSE 104. Generally, the control unit 118 may include a respective processor (not shown), a respective memory (not shown), a respective disk (not shown), and a respective input/output (I/O) interface (not shown), which are each operably connected for computer communication. The I/O interfaces provide software and hardware to facilitate data input and output between the components of the control unit 118 and other components, networks, and data sources, of the environment 100.

In one embodiment, the control unit 118 may be operably connected to a storage unit 120 that may be included as a stand-alone component of the RSE 104. The storage unit 120 may store data associated with the operation of the RSE 104 and data associated with the surrounding environment of the at least one roadway (e.g., traffic camera data). The storage unit 120 may also be configured to store data associated with one or more applications executed by the control unit 118 of the RSE 104 and/or accessed by a communication device 122 of the RSE 104, including, but not limited to the roadway safety alert application 200. In one or more embodiments, the storage unit 120 may store the neural network 116, a subset of the neural network 116, and/or or a subset of data that is utilized by the neural network 116 that may be utilized to determine the roadway user related data and/or the roadway related data.

In an exemplary embodiment, the control unit 118 may be operably connected to device sensors 124 of the RSE 104. The device sensors 124 may be utilized to sense (e.g., from a birds-eye/overhead view) and provide sensor data with respect to the road users 106, 108, 110 and the surrounding environment of the at least one roadway. In particular, the device sensors of the RSE 104 may be configured to sense the road users 106, 108, 110, that are located within the surrounding environment of the at least one roadway (e.g., that are about to enter an intersection, that are entering the intersection, that are stopped at the intersection, that are traveling through the intersection, and that are exiting the intersection) and may additionally sense environmental conditions of the at least one roadway that may influence the travel of the road users 106, 108, 110 individually and amongst one another as they are located within the surrounding environment of the at least one roadway.

As discussed below, the roadway safety alert application 200 may analyze the sensor data provided by the device sensors 124 to determine the road user related data and the roadway related data that may be utilized by the application 200 to process the roadway behavioral map and further process roadway behavioral data associated with the road user(s) 106, 108, 110 located within the surrounding environment of the at least one roadway. In one embodiment, the roadway safety alert application 200 may analyze the sensor data provided by the device sensors 124 to determine the road user related data and roadway related data associated with the non-equipped vehicle(s) 108 that are located within the surrounding environment of at least one roadway. This analysis may be used to determine the roadway behavioral data associated with the non-equipped vehicle(s) 108 to be used to provide the roadway safety alert to the equipped vehicle(s) 106 and/or the portable device(s) 112 used by the NVRU(s) 110.

In one or more embodiments, the device sensors 124 of the RSE 104 may include (individual device sensors not shown), but may not be limited to, image sensors that include stereoscopic cameras, infrared cameras, digital cameras, stereo cameras, video cameras, and the like. Additionally, the device sensors 124 may include RADAR/LADAR/LiDAR sensors, laser sensors, proximity sensors, motion sensors, etc. that may be configured to provide sensor data to the control unit 118 to be stored on the storage unit 120 and/or to be analyzed by the roadway safety alert application 200. In one or more configurations, the device sensors 124 may also include GPS sensors (not shown) that may provide a geo-location of the roadway infrastructure 102, geolocation(s) of the surrounding environment of the at least one roadway, geolocations of one or more road users 106, 108, 110 identified as being located within the surrounding environment of the at least one roadway, and geolocations of environmental conditions occurring within the surrounding environment of the at least one roadway.

In an exemplary embodiment, the device sensors 124 may be configured to sense the respective positions and locations of the road users 106, 108, 110 with respect to surrounding environment of the at least one roadway and amongst one another. Accordingly, the device sensors 124 may execute the control logic to determine positional parameters (e.g., data package) of the road users 106, 108, 110. The device sensors 124 may also be configured to sense the traveling direction, heading, or trajectory of the road users 106, 108, 110 as one or more are located within the surrounding environment of the at least one roadway. Accordingly, the device sensors 124 may execute the control logic to determine the directional parameters (e.g., data package) of the road users 106, 108, 110.

Additionally, the device sensors 124 may be configured to sense the velocity, braking status, signal usage, and the like of the road users 106, 108, 110 as they are traveling within the surrounding environment of the at least one roadway and may accordingly execute the control logic to determine the dynamic parameters (e.g., data package) associated with the road users 106, 108, 110. In one embodiment, upon determining the aforementioned parameters, the device sensors 124 may communicate the sensor data to the control unit 118 and/or the application 200. As discussed below, the roadway safety alert application 200 may analyze the sensor data to determine road user attributes (that include the aforementioned road user parameters) associated with the respective road user(s) 106, 108, 110 located within the surrounding environment of the at least one roadway.

In one embodiment, the device sensors 124 may be configured to sense environmental conditions in the form of the weather conditions that are present within the surrounding environment of the at least one roadway. More specifically, the device sensors 124 may be configured to sense weather related circumstances that may include, temperature, precipitation, percentage of day light/cloud cover, and the like that may influence the road users 106, 108, 110 located within the surrounding environment of the at least one roadway. Accordingly, the device sensors 124 may execute the control logic to determine the weather conditions (e.g., data package) associated with the surrounding environment of the at least one roadway.

The device sensors 124 may also be configured to sense environmental conditions in the form of the traffic conditions that are present within the surrounding environment of the at least one roadway. More specifically, the device sensors 124 may be configured to sense traffic related circumstances that include traffic slowdowns, traffic stoppages, vehicle accidents, road construction, and the like that may occur within the surrounding environment of the at least one roadway. Accordingly, the device sensors 124 may execute the control logic to determine the traffic conditions (e.g., data package) associated with the surrounding environment of the at least one roadway. The device sensors 124 may also be configured to sense environmental conditions in the form of infrastructure conditions that are present within the surrounding environment of the at least one roadway.

More specifically, the device sensors 124 may be configured to sense infrastructure related circumstances that may include, but may not be limited to, length/width of the at least one roadway, number of lanes of the at least one roadway, speed limits associated with the at least one roadway, curbs and objects located within the surrounding environment of the at least one roadway, and the like, and may execute the control logic to determine the infrastructure conditions (e.g., data package) associated with the surrounding environment of the at least one roadway. In one embodiment, upon determining the weather conditions, traffic conditions, and infrastructure conditions, the device sensors 124 may communicate the sensor data to the control unit 118 and/or the application 200. As discussed below, the roadway safety alert application 200 may analyze the sensor data to determine environmental attributes (that include the aforementioned environmental conditions) associated with the surrounding environment of the at least one roadway.

In an exemplary embodiment, the communication device 122 of the RSE 104 may include one or more transceivers that are capable of providing computer communications utilizing various protocols to be used to send/receive electronic signals internally to components of the RSE 104 and/or externally to the equipped vehicle(s) 106 and/or the portable device(s) 112 used by the NVRU(s) 110. The communication device 122 may be configured to provide one or more types of vehicle based communications, including, but not limited to, V2X based communications and V2I based communications through the vehicle communications network. Additionally, the communication device 122 may be configured to provide one or more types of wireless based communications, including, but not limited to IEEE 802.11 (WiFi), IEEE 802.15.1 (Bluetooth®), near field communication system (NFC) (e.g., ISO 13157) based communications via the wireless communications network. The communication device 122 may be configured to provide such communications utilizing various protocols to send/receive non-transitory signals internally to the plurality of components of the RSE 104 and/or externally to the equipped vehicle(s) 106 and/or the portable device(s) 112 used by the NVRU(s) 110.

In one embodiment, the communication device 122 may communicate with the vehicles 106, 108 and/or the portable device(s) 112 to receive sensor data that is respectively provided to the RSE 104. As discussed below, such data may be utilized by the RSE 104 to identify the existence of one or more of the road users 106, 108, 110 within the surrounding environment of the at least one roadway. As discussed below, such data may also be analyzed by the application 200 to determine classifications associated with the road users 106, 108, 110, the road user attributes and/or the environmental attributes, as discussed in more detail below.

In one embodiment, the communication device 122 may be configured to communicate the roadway behavioral data associated with the non-equipped vehicle(s) 108, the NVRU(s) 110, and/or additional equipped vehicle(s) to the equipped vehicle(s) 106 via the V2I communications protocol and/or through one or more wireless communication protocols to be analyzed to provide the roadway safety alert to the equipped vehicle(s) 106. Additionally, the communication device 122 may be configured to communicate the roadway behavioral data associated with equipped vehicle(s) 106 and/or the non-equipped vehicle(s) 108 to the portable device(s) 112 used by the NVRU(s) 110 through the one or more wireless communications protocols.

With particular reference to the equipped vehicle(s) 106, as discussed the one or more configurations of the equipped vehicle(s) 106 may be fully capable of communicating via one or more vehicle communications protocols includes the V2V communications protocol, the V2I communications protocol, and the V2X communications protocol. Additionally, one or more configurations of the equipped vehicle(s) 106 may be partially capable of communicating via one or more vehicles communications protocols that include the V2I communications protocol and/or the V2X communications protocol. In other words, some configurations of the equipped vehicle(s) 106 may be capable of communicating directly via the V2V communications protocol with additional equipped vehicle(s), while other configurations of the equipped vehicle(s) 106 may not be configured to communicate directly with the additional equipped vehicle(s) via the V2V communications protocol. In particular, in both of the aforementioned configurations of the equipped vehicle(s) 106, the equipped vehicle(s) 106 are configured to communicate directly with the RSE 104 using the V2I communications protocol to send and receive data, as discussed in more detail below.

In an exemplary embodiment, the components of the equipped vehicle(s) 106 may be operably controlled by a vehicle control device (VCD) 126. The VCD 126 may include provisions for processing, communicating, and interacting with various components of the equipped vehicle(s) 106 and other components of the environment 100. In one embodiment, the VCD 126 may be implemented on an electronic control unit (not shown), among other components of the equipped vehicle(s) 106. Generally, the VCD 126 may include a respective processor (not shown), a respective memory (not shown), a respective disk (not shown), and a respective input/output (I/O) interface (not shown), which are each operably connected for computer communication via a respective bus (not shown). The I/O interfaces provide software and hardware to facilitate data input and output between the components of the VCD 126 and other components, networks, and data sources, of the environment 100.

In one embodiment, the VCD 126 may be operably connected to one or more control units (not shown) of the equipped vehicle(s) 106 that may allow the VCD 126 to autonomously control the operation of the equipped vehicle(s) 106 in certain circumstances, including, but not limited to, when the application 200 provides the roadway safety alert to the equipped vehicle(s) 106. In particular, the VCD 126 may operably control one of more control units (not shown), that may include, but may not be limited to, an engine control unit, a transmission control unit, an acceleration control unit, a braking control unit, a steering control unit, and the like to autonomously control the operation of the equipped vehicle(s) 106 based on one or more commands that are provided by the VCD 126 through one or more vehicle systems (not shown) and/or executed applications. For example, the roadway safety alert application 200 may communicate with the VCD 126 to provide one or more commands to the one or more control units to provide the roadway safety alert by autonomously controlling the operation of the equipped vehicle(s) 106.

The VCD 126 may also be operably connected for computer communication (e.g., via the bus and/or the I/O interface) to a head unit 128 of the equipped vehicle(s) 106. The head unit 128 may include internal processing memory, an interface circuit, and bus lines (components of the head unit not shown) for transferring data, sending commands, and communicating with the components of the equipped vehicle(s) 106 directly and/or through the VCD 126. In one or more embodiments, the head unit 128 may execute one or more operating systems, applications, and/or interfaces that are associated to the equipped vehicle(s) 106 including the roadway safety alert application 200.

In some embodiments, the head unit 128 may be connected to one or more respective display devices (not shown) (e.g., head unit display screen, center stack display screen, meter display screen, heads up display screen), respective audio devices (not shown) (e.g., audio system, speakers), respective haptic devices (not shown) (e.g., haptic steering wheel), etc. that are used to provide a human machine interface (HMI) (not shown) to the driver(s) of the equipped vehicle(s) 106 with various types of information that may include, but not limited to, warnings/alerts associated with the one or more applications and/or one or more vehicle safety systems (not shown), interfaces associated with one or more vehicle systems, and/or interfaces associated with one or more components of the respective vehicles 106, 108.

In one embodiment, the VCD 126 may communicate one or more commands to the head unit 128 to actuate the respective display devices to provide the roadway safety alert. Additionally, the VCD 126 may communicate one or more commands to the head unit 128 to actuate the audio devices of the equipped vehicle(s) 106 to provide one or more audio based alerts in accordance with the roadway safety alert. For example, the roadway safety alert application 200 may communicate with the VCD 126 to provide a roadway safety alert interface that may provide one or more user interface notification warnings to the driver(s) of the equipped vehicle(s) 106 via the display devices operably connected to the head unit 128. Additionally, the roadway safety alert application 200 may communicate with the VCD 126 to provide one or more audio based alerts to alert the driver(s) of the equipped vehicle(s) 106 via the audio devices operably connected to the head unit 128. In additional embodiments, the roadway safety alert application 200 may communicate with the VCD 126 to provide one or more haptic based alerts to alert the driver(s) of the equipped vehicle(s) 106 via the haptic devices (e.g., haptic steering wheel, haptic gear shifter) connected to the head unit 128.

In one or more embodiments, the head unit 128 may be operably connected to a storage unit 130 of the equipped vehicle(s) 106. The storage unit 120 may store one or more operating systems, applications, associated operating system data, application data, vehicle system and subsystem user interface data, and the like that are executed by the VCD 126 and/or the head unit 128. In one or more embodiments, the storage unit 130 may store one or more application data files associated with the roadway safety alert application 200. Additionally the storage units 130 may store sensor data provided by vehicle sensors 132 of the equipped vehicle(s) 106 that may be utilized by the equipped vehicle(s) 106 and/or communicated externally to the RSE 104 through the V2I communications protocol and/or additional wireless communication protocols.

In an exemplary embodiment, the vehicle sensors 132 of the equipped vehicle(s) 106 may sense and provide sensor data that may be used by one or more components of the equipped vehicle(s) 106, and/or may be communicated to the RSE 104 via the V2I communications protocol. In one embodiment, upon the RSE 104 receiving the sensor data from the equipped vehicle(s) 106, the roadway safety alert application 200 may analyze the sensor data provided by the vehicle sensors 132 to determine road user related data specifically associated with the equipped vehicle(s) 106.

In some embodiments, when the equipped vehicle(s) 106 is configured to communicate via the V2V communications protocol, the sensor data provided by the vehicle sensors 132 of the equipped vehicle(s) 106 may also be communicated directly and externally to additional equipped vehicle(s) that are similarly configured to communicate through the V2V communications protocol. The sensor data may be analyzed by the additional equipped vehicle(s) to determine road user related data associated with the equipped vehicle(s) 106.

In one or more embodiments, the vehicle sensors 132 may include, but are not limited to, vehicle speed sensors, vehicle acceleration sensors, vehicle angular velocity sensors, accelerator pedal sensors, brake sensors, steering wheel angle sensors, vehicle locational sensors (e.g., GNSS coordinates), vehicle directional sensors (e.g., vehicle compass), throttle position sensors, wheel sensors, anti-lock brake sensors, camshaft sensors, anti-lock brake sensors, among other sensors. The vehicle sensors 132 may execute control logic to determine positional parameters, directional parameters, and/or dynamic parameters (data packets) associated with the equipped vehicle(s) 106. Upon determining the aforementioned parameters the vehicle sensors 132 may include the parameters as part of the sensor data that is communicated to the VCD 126 and/or the application 200 to be included as part of the determined road user attributes associated with the equipped vehicle(s) 106.

In an exemplary embodiment, the VCD 126 of the equipped vehicle(s) 106 may utilize a vehicle communication system 150 to further communicate the sensor data to the RSE 104 via the V2I communications protocol to be analyzed to determine road user attributes associated with the equipped vehicle(s) 106. In one embodiment, the sensor data may be analyzed by the roadway safety alert application 200 to determine the road user attributes associated with the equipped vehicle(s) 106. In particular, the sensor data may be aggregated with sensor data provided by the device sensors 124 of the RSE 104 to determine the road user attributes associated with the equipped vehicle(s) 106 that may be used in processing the roadway behavioral map to determine the roadway behavioral data associated with equipped vehicle(s) 106.

In an exemplary embodiment, the vehicle communication system 150 may include one or more transceivers (e.g., V2V transceivers, wireless communication transceivers) that are capable of providing computer communications utilizing various protocols to be utilized to send/receive electronic signals internally to components of the equipped vehicle(s) 106 and/or externally to the RSE 104. In some configurations, the vehicle communication system 150 may be configured to send/receive the electronic signals externally to one or more additional equipped vehicles.

In one configuration, the vehicle communication system 150 may be configured to fully communicate via one or more vehicle communications protocols to provide one or more types of vehicle based communications, including, but not limited to, V2V based communications, V2I based communications, and V2X based communications through the vehicle communications network. In another configuration, the vehicle communication system 150 may be configured to communicate via the V2I based communications and V2X based communications through the vehicle communications network.

In one or more embodiments, the vehicle communication system 150 may also be configured to provide one or more types of wireless based communications, including, but not limited to IEEE 802.11 (WiFi), IEEE 802.15.1 (Bluetooth®), near field communication system (NFC) (e.g., ISO 13157) based communications via the wireless communications network. In particular, the vehicle communication system 150 may be configured to provide such communications utilizing various protocols to send/receive non-transitory signals internally to the plurality of components of the equipped vehicle(s) 106 and/or externally to the RSE 104 through the V2I communications protocol.

In one embodiment, the vehicle communication system 150 may be configured to directly communicate with the RSE 104 to send sensor data provided by the vehicle sensors 132. In particular, the vehicle communication system 150 may be configured to send the sensor data that is provided by the vehicle sensors 132 to be analyzed by the application 200 to determine road user attributes associated with the equipped vehicle(s) 106. For example, the vehicle communication system 150 may be utilized to communicate the sensor data that is provided by the vehicle sensors 132 to the communication device 122 of the RSE 104 to allow the RSE 104 to determine the existence of the equipped vehicle(s) 106 and to determine road user parameters associated with the equipped vehicle(s) 106 within the surrounding environment of the at least one roadway. In some configurations in which the equipped vehicle(s) 106 may be configured to fully communicate via the V2V communications protocol, the vehicle communication system 150 may be used to communicate the sensor data to one or more additional equipped vehicles that are similarly configured to communicate via the V2V communications protocol and that are located within a predetermined vicinity of the equipped vehicle(s) 106 to allow the additional equipped vehicle(s) to determine the existence of the equipped vehicle(s) 106 and road user parameters associated with the equipped vehicle(s) 106.

The vehicle communication system 150 may also be configured to receive sensor data, the roadway behavioral data associated with the road user(s) 106, 108, 110, and/or communications associated with providing the roadway safety alert from the RSE 104 using the V2I communications protocol based on sensor data that is provided by the device sensors 124 and/or sensor data that is communicated to the equipped vehicle(s) 106 from additional equipped vehicle(s) through the V2V communications protocol. In some embodiments, the vehicle communication system 150 may receive sensor data directly communicated by the portable device(s) 112 to the RSE 104 via the V2I communications protocol and/or additional wireless communication protocols.

In an exemplary embodiment, the vehicle communication system 150 may receive sensor data provided by the device sensors 124 and the roadway behavioral data associated with non-equipped vehicle(s) 108 via the V2I communications protocol as sensed by the device sensors 124 of the RSE 104 to provide the roadway behavioral data associated with non-equipped vehicle(s) 108 to the equipped vehicle(s) 106. In other words, the RSE 104 may indirectly relay road user related data determined based on sensor data provided by the RSE 104 with respect to the non-equipped vehicle(s) 108 to the equipped vehicle(s) 106. In some embodiments, the sensor data received from the RSE 104 and/or the additional equipped vehicle(s) may allow the equipped vehicle(s) 106 to determine the existence of the additional equipped vehicle(s), the non-equipped vehicle(s) 108, and/or the NVRU(s) 110 that may be located within the surrounding environment of the at least one roadway (e.g., within a predetermined vicinity of the equipped vehicle(s) 106).

The vehicle communication system 150 may be additionally configured to receive application data associated with the roadway safety alert application 200. More specifically, in one embodiment, the application 200 may process the roadway behavioral map and determine the roadway behavioral data associated with road user(s) 106, 108, 110 using the components of the RSE 104. Upon being processed by the components of the RSE 104, the communication device 122 of the RSE 104 may be configured to communicate the roadway behavioral data associated with road user(s) 106, 108, 110 to the vehicle communication system 150 to be analyzed by components (e.g., vehicle systems) of the equipped vehicle(s) 106. Additionally, in some configurations, the communication device 122 of the RSE 104 may communicate data that is associated with providing the roadway safety alert that is based on the roadway behavioral data associated with non-equipped vehicle(s) 108 and/or the NVRU(s) 110 with respect to the equipped vehicle(s) 106 to be received by the vehicle communication system 150 and implemented by the VCD 126 of the equipped vehicle(s) 106 to provide the roadway safety alert to the driver(s) of the equipped vehicle(s) 106.

With particular reference to the non-equipped vehicle(s) 108, the non-equipped vehicle(s) 108 may not be equipped nor configured to communicate via one or more vehicle communications protocols and/or one or more wireless communications protocols. Consequently, the non-equipped vehicle(s) 108 may not be configured to communicate data to the equipped vehicle(s) 106, the RSE 104, and/or the portable device(s) 112 used by the NVRU(s) 110. The application 200 may utilize sensor data provided by the RSE 104 and/or the equipped vehicle(s) 106 to determine positional parameters, directional parameters, and/or dynamic parameters (data packets) associated with the non-equipped vehicle(s) 108. In other words, road user attributes associated with the non-equipped vehicle(s) 108 may be determined based on sensor data provided by the RSE 104 and/or the equipped vehicle(s) 106 to process the roadway behavioral data associated with non-equipped vehicle(s) 108.

In an exemplary embodiment, the non-equipped vehicle(s) 108 may include a VCD 134 that may include provisions for processing, communicating, and interacting with various components of the non-equipped vehicle(s) 108 and other components of the environment 100. In one embodiment, the VCD 134 may be implemented on an electronic control unit (not shown), among other components of the equipped vehicle(s) 106. Generally, the VCD 134 may include a respective processor (not shown), a respective memory (not shown), a respective disk (not shown), and a respective input/output (I/O) interface (not shown), which are each operably connected for computer communication via a respective bus (not shown). The I/O interfaces provide software and hardware to facilitate data input and output between the components of the VCD 134 and other components of the environment 100.

In some embodiments, the VCD 134 may be operably connected to vehicle sensors 136, that may include one or more sensors (not shown) that are similar to the sensors discussed above with respect to the vehicle sensors 132 of the equipped vehicle(s) 106. In some configurations, the VCD 134 may utilize the vehicle sensors 136 to provide sensor data that may be locally utilized by the non-equipped vehicle(s) 108 to provide one or more alerts related to the road user(s) 106, 110 sensed within a predetermined distance of the non-equipped vehicle(s) 108.

With particular reference to the portable device(s) 112 used by the NVRU(s) 110, the portable device(s) 112 may include, but may not be limited to, a hand-held device, a mobile-device, a wearable-device, a smart phone, a laptop, a tablet, and the like. The portable device(s) 112 may include a control unit 138 that may process and compute functions associated with the components of the portable device(s) 112. In one embodiment, the control unit 138 may be operably connected to a respective storage unit 140 of the portable device(s) 112. The storage unit 140 may store one or more operating systems, applications, associated operating system data, application data, vehicle system and subsystem user interface data, and the like that are executed by the control unit 138. In one or more embodiments, the storage unit 140 may store one or more application data files associated with the roadway safety alert application 200. Additionally the storage unit 140 may store sensor data provided by device sensors 142 of the portable device(s) 112.

The device sensors 142 of the portable device(s) 112 may include, but may not be limited to, an accelerometer, a magnetometer, a gyroscope, an ambient light sensor, a proximity sensor, a locational sensor (e.g., GPS), a positional sensor, a directional sensor (e.g., compass), and the like (device sensors 142 not individually shown). The device sensors 142 may sense and provide sensor data that may be used by one or more components of the portable device(s) 112 and/or the RSE 104. In particular, the roadway safety alert application 200 may analyze the sensor data provided by the device sensors 142 to determine road user related data specifically associated with the respective NVRU(s) 110.

In an exemplary embodiment, the device sensors 142 may execute control logic to determine positional parameters, directional parameters, and/or dynamic parameters (data packets) associated with the respective NVRU(s) 110 that use the portable device(s) 112. Upon determining the aforementioned parameters, the device sensors 142 may include the parameters as part of the sensor data and may communicate the sensor data to the control unit 138. The control unit 138 may utilize a device communication system 144 to further communicate the sensor data to the RSE 104 to be analyzed to determine road user attributes associated with the NVRU(s) 110. In one embodiment, the sensor data may be analyzed by the roadway safety alert application 200 to determine the road user attributes associated with the NVRU(s) 110 and may be used in processing the roadway behavioral map.

The device communication system 144 of the portable device(s) 112 may include one or more transceivers (e.g., wireless communication transceivers) that are capable of providing computer communications utilizing various protocols to be utilized to send/receive electronic signals internally to components of the portable device(s) 112 and/or externally to the RSE 104. The device communication system 144 may be configured to provide one or more types of wireless based communications, including, but not limited to IEEE 802.11 (WiFi), IEEE 802.15.1 (Bluetooth®), near field communication system (NFC) (e.g., ISO 13157) based communications via the wireless communications network. In particular, the device communication system 144 may be configured to provide such communications utilizing various protocols to send/receive non-transitory signals internally to the plurality of components of the portable device(s) 112 and/or externally to the RSE 104 through the V2X communications protocol.

The device communication system 144 may be configured to directly communicate with the RSE 104 to send sensor data that is provided by the device sensors 142 through one or more wireless communication protocols. In particular, the device communication system 144 may be configured to send the sensor data that is provided by the device sensors 142 to be analyzed by the application 200 to determine road user attributes associated with the NVRU(s) 110. For example, the device communication system 144 may be utilized to communicate the sensor data that is provided by the device sensors 142 to the communication device 122 of the RSE 104 to allow the RSE 104 to determine the existence of the NVRU(s) 110 and road user attributes associated with the NVRU(s) 110 within the surrounding environment of the at least one roadway.

In one embodiment, the device communication system 144 may also be configured to receive sensor data, roadway behavioral data associated with the road user(s) 106, 108, 110 and/or communications associated with providing the roadway safety alert from the RSE 104 using one or more wireless communications protocols based on sensor data that is provided by the device sensors 124 and/or sensor data that is communicated to the RSE 104 from equipped vehicle(s) 106. The device communication system 144 may be additionally configured to receive application data associated with the roadway safety alert application 200. More specifically, in one embodiment, the application 200 may process and store the roadway behavioral map using the components of the RSE 104. Upon being processed by the components of the RSE 104 and stored on the storage unit 120, the communication device 122 of the RSE 104 may be configured to communicate the roadway behavioral map to the device communication system 144 to be analyzed by components (e.g., vehicle systems) of the equipped vehicle(s) 106.

In some configurations, the communication device 122 of the RSE 104 may communicate data that is associated with providing the roadway safety alert to be received by the device communication system 144 and implemented by the control unit 138 of the portable device(s) 112 to provide the roadway safety alert to the respective NVRU(s) 110. In one or more embodiments, the portable device(s) 112 may include a display screen(s) (not shown) and a speaker(s) (not shown) that may be operably controlled by the control unit 138 to provide the roadway safety alert to the NVRU(s) 110 using the portable device(s) 112. In particular, the roadway safety alert application 200 may communicate with the control unit 138 to provide a roadway safety alert interface that may present one or more user interface notification warnings to the NVRU(s) 110 using the portable device(s) 112 via the display screen(s). Additionally, the roadway safety alert application 200 may communicate with the control unit 138 to provide one or more audio based alerts to alert the NVRU(s) 110 via the speaker(s) of the respective portable device(s) 112.

With particular reference to the neural network 116, in one embodiment, the neural network 116 may process a programming model which enables computer/machine based learning that may be centered on one or more forms of data that are provided to the neural network 116 and/or learned by the neural network 116. As discussed above, in addition to being hosted on the externally hosted server infrastructure 114, the neural network 116, subsets of the neural network 116, and/or subsets of data that may be used by the neural network 116 may also be hosted and/or executed by the equipped vehicle(s) 106 and/or the portable device(s) 112. As discussed in more detail below, the neural network 116 may be accessed to provide the classifications associated with the road users 106, 108, 110 that are identified by the application 200 as being located within the surrounding environment of the at least one roadway based on sensor data as provided by the device sensors 124. In additional embodiments, the neural network 116 may be accessed to provide the classifications based on sensor data that may also be provided by the vehicle sensors 132 and/or the device sensors 142.

In one or more embodiments, the neural network 116 may include a neural network processing unit 146 and a neural network deep learning database 148. The neural network processing unit 146 may be configured to utilize machine learning/deep learning to provide artificial intelligence capabilities that may be utilized to build and maintain the neural network deep learning database 148 with various types of data. The neural network processing unit 146 may process information that is provided as inputs and may utilize the neural network deep learning database 148 to access stored computer/machine learned data to provide various functions, that may include, but may not be limited to, object classification, feature recognition, computer vision, speed recognition, machine translation, autonomous driving commands, and the like.

In one or more embodiments, the neural network deep learning database 148 may store road user classification data (not shown) that may be accessed and analyzed by the roadway safety alert application 200 to determine the classifications associated with the road users 106, 108, 110 located within the surrounding environment of the at least one roadway (e.g., as sensed by the device sensors 124 of the RSE 104). In particular, upon receiving sensor data, the application 200 may communicate with the neural network processing unit 146 to determine classification data based on the sensor data provided by the device sensors 124. In some embodiments, the application 200 may communicate with the neural network processing unit 146 to determine classification data based on aggregated sensor data that is provided by the sensors 124, 132, 142. The neural network processing unit 146 may analyze the sensor data by utilizing the neural network deep learning database 148 to determine the classification(s) associated with the respective road users 106, 108, 110 located within the surrounding environment of the at least one roadway.

In one embodiment, the neural network deep learning database 148 may include roadway map data (not shown) that may be accessed and used by the application 200 to acquire an up-to-date geographical map (geographical map) (not shown) of the surrounding environment of the at least one roadway (e.g., a geographical map of the roadways that are part of a traffic intersection). In an alternate embodiment, the roadway map data may be stored externally and may be accessed by the neural network processing unit 146 to be used by the application 200. The roadway map data may be updated periodically through one or more internet based updates that may be communicated to the neural network 116 through the externally hosted server infrastructure 114. In particular, the roadway map data may include geographical maps and satellite/aerial imagery of the surrounding environment of the at least one roadway at which the roadway infrastructure 102 is located. In some configurations, the roadway map data may also include road network data, landmark data, aerial view data, street view data, political boundary data, centralized traffic data, centralized infrastructure data, etc. As discussed below, the application 200 may access the neural network 116 to acquire the geographical map of the surrounding environment of the at least one roadway during the processing of the roadway behavioral map.

In an additional embodiment, the roadway safety alert application 200 may also access the neural network processing unit 146 to train the neural network 116 when the classification associated with one or more of the road users 106, 108, 110 may not be determined. The application 200 may train the neural network 116 by updating the neural network deep learning database 148 with the data that may be manually provided (e.g., by a user updating the network) or automatically accessed through the internet cloud (e.g., by accessing a vehicle manufacture database and/or a department of transportation database) to ensure that the neural network 116 may be used to accurately classify the road user(s) 106, 108, 110 that may not have been previously been determined.

II. Roadway Safety Alert Application

The components of the roadway safety alert application 200 will now be described according to an exemplary embodiment with reference to FIG. 1 and FIG. 2. As discussed above, the roadway safety alert application 200 may be stored on one or more of the storage units 120, 130, 140 and executed by the control unit 118 of the RSE 104, the VCD 126 of the equipped vehicle(s) 106 and/or the control unit 138 of the portable device(s) 112. In an another embodiment, the roadway safety alert application 200 may be stored on the externally hosted server infrastructure 114 and may be accessed by the RSE 104, the vehicles 106, and/or the portable device(s) 112. In an alternate embodiment, data associated with the application 200 may be stored locally by the VCD 134 of the non-equipped vehicle(s) 108 to be utilized locally by the non-equipped vehicle(s) 108.

In an exemplary embodiment, the roadway safety alert application 200 may include a road user identification module 202, a road user classification module 204, an attribute determinant module 206, a roadway behavioral module 208, and a roadway safety alert module 210. It is to be appreciated that the roadway safety alert application 200 may include additional modules and/or sub-modules that are configured to execute one or more functions of the application 200. In one or more embodiments, the road user identification module 202 of the roadway safety alert application 200 may be configured to communicate with the control unit 118 of the RSE 104 to acquire sensor data that is provided by the device sensors 124 of the RSE 104 and/or communicated to the RSE 104 from the equipped vehicle(s) 106 and/or the portable device(s) 112. The road user identification module 202 may be configured to analyze the sensor data and identify one or more road users 106, 108, 110 that are located within the surrounding environment of the at least one roadway. For example, the road user identification module 202 may analyze sensor data that may include one or more birds-eye/overhead view images provided by the device sensors 124 of the RSE 104 to identify the existence of the equipped vehicle(s) 106, the non-equipped vehicle(s) 108, and/or the NVRU(s) 110 that are located within the surrounding environment of roadways that are part of an intersection at which the roadway infrastructure 102 is located.

Upon identifying the one or more road users 106, 108, 110 that are located within the surrounding environment of the at least one roadway, the road user identification module 202 may communicate data associated with the identification of the one or more road users 106, 108, 110 to the road user classification module 204 and the attribute determinant module 206 of the roadway safety alert application 200. In one or more embodiments, the road user classification module 204 may acquire sensor data from the RSE 104, the equipped vehicle(s) 106 and/or the portable device(s) 112 to determine the classification associated with the one or more road users 106, 108, 110 identified as being located within the surrounding environment of the at least one roadway. In particular, the road user classification module 204 may communicate with the control unit 118 of the RSE 104 to acquire sensor data that is provided by the device sensors 124 of the RSE 104. In addition, the road user classification module 204 may communicate with the VCD 126 of the equipped vehicle(s) 106 and/or the control unit 138 of the portable device(s) 112 to acquire respective sensor data associated with the equipped vehicle(s) 106 and/or the portable device(s) 112.

In an exemplary embodiment, upon acquiring the sensor data associated with one or more of the road users, the road user classification module 204 may communicate the sensor data to the neural network 116 to determine the classifications associated with the one or more of the road users 106, 108, 110 identified as being located within the surrounding environment of the at least one roadway. The road user classification module 204 may additionally be configured to train the neural network 116 based on, for example, sensor data pertaining to images provided by the RSE 104. For example, if the classification(s) associated with the identified road user(s) 106, 108, 110 is a new or unknown, the neural network 116 may be trained to learn new vehicle classifications associated with new vehicle types not known to the neural network 116. Upon determining the classifications associated with the one or more of the road users 106, 108, 110, the road user classification module 204 may communicate the classifications to the roadway behavioral module 208. As discussed below, the roadway behavioral module 208 may utilize road user data that may partially include the classifications to process the roadway behavioral data associated with the road user(s) 106, 108, 110 identified as being located within the surrounding environment of the at least one road user 106, 108, 110.

The roadway behavioral module 208 may additionally receive road user attribute data respectively associated with one or more of the road users 106, 108, 110 from the attribute determinant module 206. The attribute determinant module 206 may also provide the roadway behavioral module 208 with environmental attributes associated with the surrounding environment of the at least one roadway. More specifically, the attribute determinant module 206 may communicate with the control unit 118 of the RSE 104 to acquire sensor data provided by the device sensors 124 and/or communicated to the RSE 104 from the equipped vehicle(s) 106 and/or the portable device(s) 112.

In one embodiment, the attribute determinant module 206 may analyze sensor data provided by device sensors 124 to determine road user attributes respectively associated with one or more of the road users 106, 108, 110 identified by the road user identification module 202. In an additional embodiment, the attribute determinant module 206 may aggregate sensor data provided by the device sensors 124 with sensor data provided by the vehicle sensors 132 of the equipped vehicle(s) 106 and/or the device sensors 142 of the portable device(s) 112 to determine the road user attributes respectively associated with one or more of the road users 106, 108, 110 identified by the road user identification module 202.

In an exemplary embodiment, upon acquiring the sensor data associated with one or more of the road users 106, 108, 110, the attribute determinant module 206 may determine the road user attributes that may include, but may not be limited to, the positional parameters, directional parameters, and/or the dynamic parameters that are associated with the road users 106, 108, 110. In one embodiment, the attribute determinant module 206 may additionally analyze the sensor data provided by the device sensors 124 of the RSE 104 to determine the environmental attributes associated with the surrounding environment of the at least one roadway. As discussed, the environmental attributes may include, but may not be limited to, the weather conditions, the traffic conditions, and/or the infrastructure conditions that are determined based on sensor data sensed by one or more components of the RSE 104.

In one or more embodiments, upon receiving the classifications associated with one or more of the road users 106, 108, 110 and the road user attributes that are included within the road user related data and the environmental attributes that are included within the roadway related data, the roadway behavioral module 208 may process a roadway behavioral map and may analyze the roadway behavioral map to further process roadway behavioral data associated with the road user(s) 106, 108, 110 identified as being located within the surrounding environment of the at least one roadway. More specifically, the roadway behavioral module 208 may analyze the road user related data and roadway related data and may process the roadway behavioral map based on an augmentation of the geographical map of the surrounding environment of the at least one roadway that may be provided the neural network 116.

In particular, upon obtaining the geographical map of the surrounding environment of the at least one roadway from the neural network 116, the roadway behavioral module 208 may augment the geographical map with the indications representing the road user(s) 106, 108, 110 located within the surrounding environment of the at least one roadway. Such indications may include graphical representations and/or data that represent the classifications of the road user(s) 106, 108, 110 that are identified and determined by the application 200. Additionally, the geographical map may be augmented with data that is indicative of the road user attributes associated with the road users 106, 108, 110 located within the surrounding environment of the at least one roadway. The roadway behavioral module 208 may also augment the geographical map with data that is indicative of the environmental attributes associated with the surrounding environment of the at least one roadway. In some embodiments, the geographical map may be augmented to present environmental attributes that may specifically impact the one or more road users located within the surrounding environmental of the at least one roadway.

In an exemplary embodiment, upon processing the roadway behavioral map, the roadway behavioral module 208 may further analyze the roadway related data associated with the surrounding environment of the at least one roadway, the road user(s) 106, 108, 110 indicated within the surrounding environment of the at least one roadway, and the road user related data. Additionally, the roadway behavioral module 208 may analyze and predict the path of travel, rate of travel, direction or travel, and overlap of travel between one or more of the road users 106, 108, 110 located within the surrounding environment of the at least one roadway and may further analyze and predict environmental conditions that may impact the predicted paths of travel. This analysis and prediction may be utilized to process the roadway behavioral data that is associated to each respective road user(s) 106, 108, 110 that provides information associated with the road user related data, roadway related data, the analyzed and predicted overlap between the predicted paths of travel of one or more of the road users 106, 108, 110, environmental conditions that may impact one or more of the road users 106, 108, 110, and how such data may affect each of the respective road user(s) 106, 108, 110 located within the surrounding environment of the at least one roadway.

As an illustrative example, the roadway behavioral module 208 may augment the geographical map provided by neural network 116 with indications of non-equipped vehicle(s) 108 approaching and/or traveling within a surrounding environment of roadways that are a part of an intersection at which the roadway infrastructure 102 is located. The roadway behavioral map may include positional parameters, directional parameters, and/or dynamical parameters associated with the non-equipped vehicle(s) 108. The roadway behavioral module 208 may additionally augment the geographical map with the weather conditions, traffic conditions, and infrastructure conditions as sensed by the device sensors 124 of the RSE 104. The roadway behavioral module 208 may analyze the roadway behavioral map to analyze and predict overlap(s) in traveling paths of the non-equipped vehicle(s) 108 and the equipped vehicle(s) 106 within the surrounding environment of the at least one roadway and environmental conditions that may be occurring within the surrounding environment of the at least one roadway that may possibly impact the non-equipped vehicle(s) 108 and the equipped vehicle(s) 106 located within the surrounding environment of the at least one roadway. This information may be processed into the roadway behavioral data associated with the non-equipped vehicle(s) 108.

In an exemplary embodiment, the roadway behavioral module 208 may communicate the roadway behavioral data associated with the road user(s) 106, 108, 110 to the roadway safety alert module 210. The roadway safety alert module 210 may evaluate the roadway behavioral data and may provide a safety alert that is associated with each respective road user(s) 106, 108, 110 that provides information associated with the road user related data and the roadway related data. The roadway safety alert may also provide information as to how environmental attributes and roadway attributes may affect each of the respective road user(s) 106, 108, 110 located within the surrounding environment of the at least one roadway.

As an illustrative example, the roadway safety alert may provide the driver(s) of the equipped vehicle(s) 106, information about the classification and road user attributes associated with the non-equipped vehicle(s) 108 identified by the application 200 as being located within the surrounding environment of the at least one roadway along with environmental conditions associated with the surrounding environment of the at least one roadway.

In one embodiment, the roadway safety alert may be provided by the application 200 to ensure that the driver of the equipped vehicle(s) 106 is made aware of the environmental attributes associated with the surrounding environment of the at least one roadway and the classifications and attributes associated with the non-equipped vehicle(s) 108 and/or NVRU(s) 110 that may not be capable of directly communicating such data to the equipped vehicle(s) 106 through the V2V communications protocol (e.g., to provide cooperative safety/collision related alerts).

In particular, this functionality may ensure that the equipped vehicle(s) 106 is provided with the location, direction of travel, trajectory of travel, and environmental conditions that may impact the travel of the non-equipped vehicle(s) 108 and/or the NVRU(s) 110 located within the surrounding environment of the at least one roadway (at which the equipped vehicle(s) 106 is located) and may therefore impact the travel of the equipped vehicle(s) 106. In other words, the roadway safety alert application 200 may provide information regarding the road users 108, 110 and the surrounding environment of the at least one roadway to the equipped vehicle(s) 106 to overcome the inability of the non-equipped vehicle(s) 108 and/or the portable device(s) 112 to directly communicate the classification and attributes related to itself and/or the NVRU 110 and associated environmental attributes with the equipped vehicle(s) 106 through the V2V communications protocol. For example, the application 200 may utilize the roadway infrastructure 102 as a relay point/proxy to provide safety alert(s) associated with the non-equipped vehicle(s) 108 and/or the NVRU(s) 110 to the equipped vehicle(s) 106 in lieu of such information not being directly communicated to the equipped vehicle(s) 106 through the V2V communications protocol.

III. Methods Related to the Roadway Safety Alert Application and System

Figure 3:
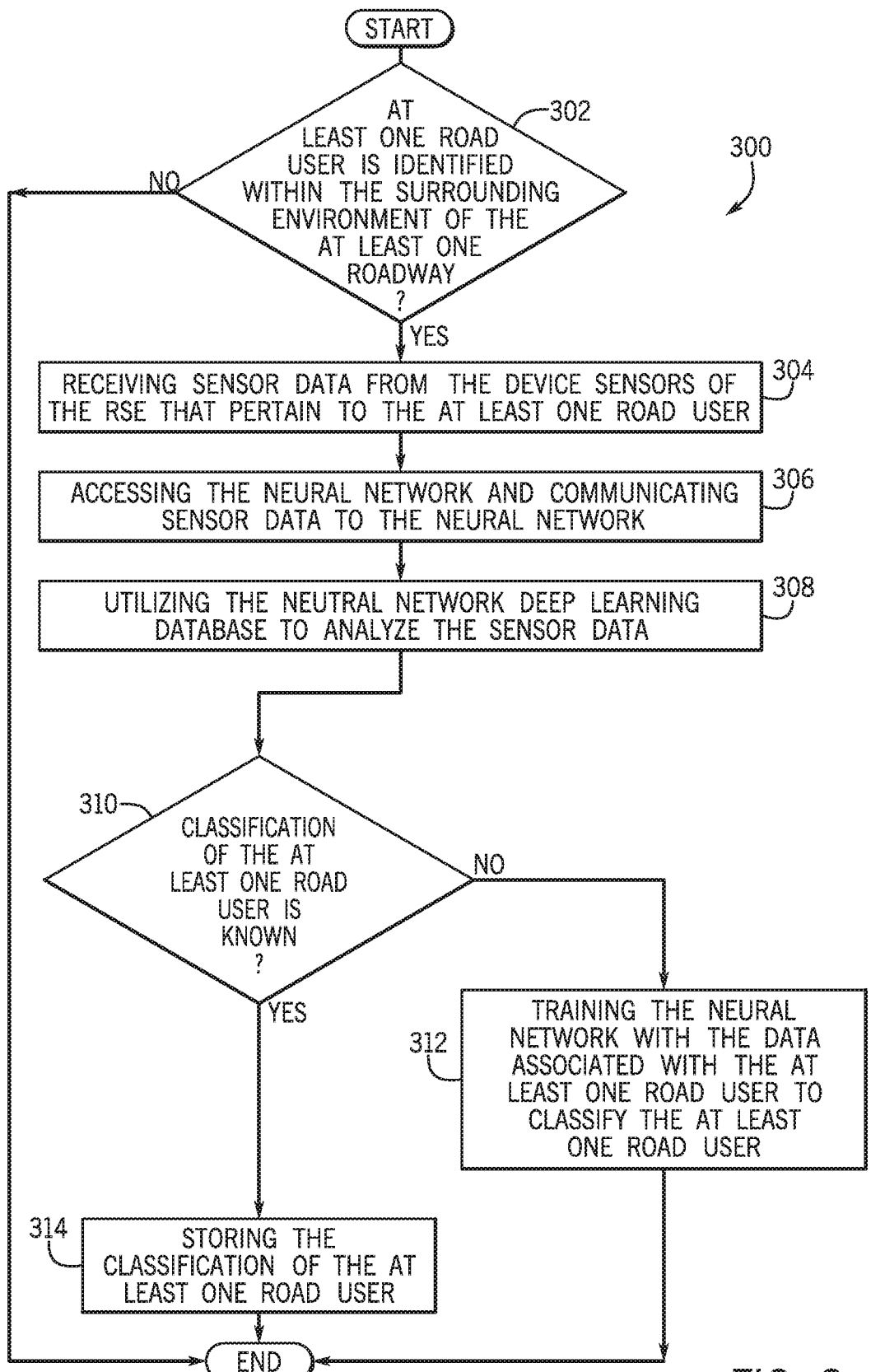
FIG. 3 is a process flow diagram of a method for identifying at least one road user and determining a classification associated with the at least one road user according to an exemplary embodiment.

FIG. 3 is a process flow diagram of a method 300 for identifying at least one road user and determining a classification associated with the at least one road user according to an exemplary embodiment. FIG. 3 will be described with reference to the components of FIG. 1 and FIG. 2, though it is to be appreciated that the method 300 of FIG. 3 may be used with other system and/or components. The method 300 may begin at block 302, wherein the method 300 may include determining if at least one road user 106, 108, 110 is identified within the surrounding environment of the at least one roadway. As discussed above, the device sensors 124 of the RSE 104 may be configured to output sensor data based on sensing of the birds-eye/overhead view of the surrounding environment of the at least one roadway. Additionally, the equipped vehicle(s) 106 and/or the portable device(s) 112 may communicate sensor data sensed by the vehicle sensors 132 and/or the device sensors 142 to the RSE 104.

In an exemplary embodiment, the road user identification module 202 of the roadway safety alert application 200 may be configured to communicate with the control unit 118 of the RSE 104 to acquire sensor data that is provided by the device sensors 124 of the RSE 104 and/or communicated to the RSE 104 from the equipped vehicle(s) 106 and/or the portable device(s) 112. The road user identification module 202 may be configured to analyze the sensor data and identify one or more of the road users 106, 108, 110 that are located within the surrounding environment of the at least one roadway. In one embodiment, upon being identified, the road user(s) 106, 108, 110 may be tagged by the road user identification module 202 with a geo-location tag that may be determined based on GPS sensors of the device sensors 124. Upon tagging the road user(s), the road user identification module 202 may communicate the geo-location tag(s) associated with the identified road user(s) 106, 108, 110 to the road user classification module 204 and the attribute determinant module 206 of the roadway safety alert application 200.

If it is determined that at least one road user 106, 108, 110 is identified within the surrounding environment of the at least one roadway (at block 302), the method 300 may proceed to block 304, wherein the method 300 may include receiving sensor data from the device sensors of the RSE 104 that pertain to the at least one road user. In an exemplary embodiment, upon receiving the geo-location tag(s) associated with the identified road user(s) 106, 108, 110 from the road user identification module 202, the road user classification module 204 may receive sensor data from the device sensors 124 of the RSE 104 that pertains to the respective identified road user(s) 106, 108, 110. In particular, the road user classification module 204 may communicate with the control unit 118 to receive the sensor data provided by the device sensors 124 based on sensing of the birds-eye/overhead view of the surrounding environment of the at least one roadway.

In another embodiment, the road user classification module 204 may communicate with the VCD 126 of the equipped vehicle(s) 106 and/or the control unit 138 of the portable device(s) 112 in addition to or in lieu of communicating with the control unit 118 of the RSE 104 to acquire respective sensor data associated with the equipped vehicle(s) 106 and/or the portable device(s) 112. This functionality may ensure that the road user classification module 204 may acquire data that is locally sensed by the equipped vehicle(s) 106 and/or the portable device(s) 112 and therefore this data may provide details more pertinent to the equipped vehicle(s) 106 and the portable device(s) 112. Additionally, this functionality may ensure that road user classification module 204 may acquire data that is sensed by the equipped vehicle(s) 106 that pertain to the non-equipped vehicle(s) 108 as sensed by the vehicle sensors 132 to provide details pertinent to the non-equipped vehicle(s) 108 in relation to the equipped vehicle(s) 106.

The method 300 may proceed to block 306, wherein the method 300 may include accessing the neural network 116 and communicating sensor data to the neural network. In one embodiment, upon receiving the sensor data from the RSE 104, the equipped vehicle(s) 106 and/or the portable device(s) 112, the road user classification module 204 may access the neural network 116 by communicating with the externally hosted server infrastructure 114. In alternate embodiments, the road user classification module 204 may access the neural network 116 by communicating with the externally hosted server infrastructure 114, the RSE 104, the equipped vehicle(s) 106, and/or the portable device(s) 112 based on the location(s) that the neural network 116 is hosted and/or executed.

The method 300 may proceed to block 308, wherein the method 300 may include utilizing the neural network deep learning database to analyze the sensor data. In an exemplary embodiment, upon accessing the neural network 116, the sensor data provided by the RSE 104, the vehicles 106, 108 and/or the portable device(s) 112 may be processed by the neural network processing unit 146. Upon processing of the sensor data, the neural network processing unit 146 may extract one or more data points from the sensor data that may be used to query the neural network deep learning database 148. In one embodiment, the neural network processing unit 146 may perform a query for classification data that is associated with the identified road user(s) 106, 108, 110 to retrieve classification(s) associated with the road user(s) 106, 108, 110 from the neural network deep learning database 148.

The method 300 may proceed to block 310, wherein the method 300 may include determining if the classification of the at least one road user 106, 108, 110 is known. Upon processing of the sensor data by the neural network processing unit 146, the neural network processing unit 146 may perform a query based on the data points extracted from the sensor data. The neural network 116 may utilize machine learning to determine and output the classification(s) associated with the road user(s) 106, 108, 110 if the neural network deep learning database 148 includes data associated with the classification(s). In certain circumstances, when the classification(s) associated with the road user(s) 106, 108, 110 may not be known by the neural networks 116, the neural network 116 may output a null message(s) that indicates that the classification(s) may not be known (e.g., when the neural network deep learning database 148 does not include data associated with the classifications associated with vehicles 106, 108, and/or NVRU(s) 110). In one embodiment, the neural network 116 may communicate the classification(s) and/or the null message(s) to the road user classification module 204. Based on the receipt of the classification(s) and/or the null message(s), the road user classification module 204 may determine if the classification of the at least one road user 106, 108, 110 is (or is not) known.

If it is determined that the classification of the at least one road user 106, 108, 110 is not known (at block 310), the method 300 may proceed to block 312, wherein the method 300 may include training the neural network 116 with data associated with the at least one road user to classify the at least one road user. In one embodiment, upon determining that the classification(s) associated with the road user(s) 106, 108, 110 is not known by the neural network 116, the road user classification module 204 may train the neural network 116 by updating the neural network deep learning database 148 with the data that may be manually provided (e.g., by a user updating the network) or automatically accessed through the internet cloud (e.g., by accessing a department of transportation database) to ensure that the neural network 116 may be used to accurately classify the road user(s) 106, 108, 110 that may not have been previously been classified. In some embodiments, the road user classification module 204 may utilize machine learning sensor evaluation and/or machine learning image evaluation processing techniques to determine additional data that may be provided to the neural network processing unit 146 to train (e.g., update) the neural network deep learning database 148 to ensure that the road user(s) may be classified.

If it is determined that the classification of the at least one road user is known (at block 310) or upon training the neural network (at block 314), the method 300 may proceed to block 314, wherein the method 300 may include storing the classification of the at least one road user. In an exemplary embodiment, upon determining the classification(s) associated with the identified road user(s) 106, 108, 110, the road user classification module 204 may store the classification(s) associated with the road user(s) 106, 108, 110 identified as being located within the surrounding environment of the at least roadway. More specifically, the road user classification module 204 may access one or more of the storage units 120, 130, 140 and may store a data file(s) that includes the classification(s) associated with the identified road user(s) 106, 108, 110 located within the surrounding environment of the at least one roadway.

Figure 4:
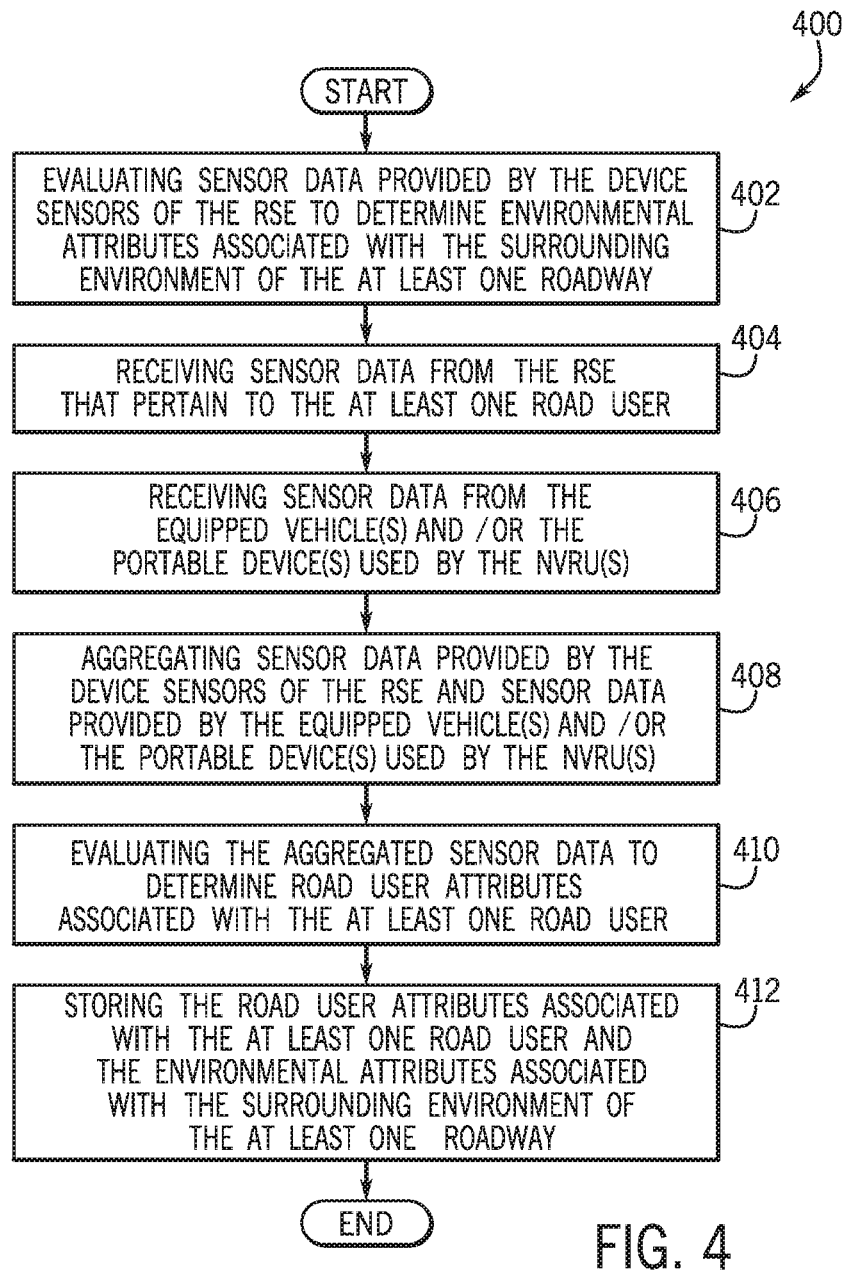
FIG. 4 is a process flow diagram of a method for determining road user attributes associated with the at least one road user and the environmental attributes associated with a surrounding environment of the at least one roadway according to an exemplary embodiment.

FIG. 4 is a process flow diagram of a method 400 for determining road user attributes associated with the at least one road user and the environmental attributes associated with the surrounding environment of the at least one roadway according to an exemplary embodiment. FIG. 4 will be described with reference to the components of FIG. 1 and FIG. 2, though it is to be appreciated that the method 400 of FIG. 4 may be used with other system and/or components. The method 400 may begin at block 402, wherein the method 400 may include evaluating sensor data provided by the device sensors 124 of the RSE 104 to determine environmental attributes associated with the surrounding environment of the at least one roadway.

As discussed above, the device sensors 124 of the RSE 104 may be configured to output sensor data based on sensing of the birds-eye/overhead view of the surrounding environment of the at least one roadway. The sensor data may be used to determine environmental attributes associated with the surrounding environment of the at least one roadway. In particular, the device sensors 124 may output sensor data that may include environmental conditions of the surrounding environment of the at least one roadway (e.g., weather conditions within the surrounding environment of the intersection, ice on roadways that are part of the intersection, puddles on roadways that are a part of the intersection) that may influence the travel of the identified road user(s) 106, 108, 110 within the surrounding environment of the at least one roadway.

In an exemplary embodiment, the attribute determinant module 206 of the roadway safety alert application 200 may be configured to communicate with the control unit 118 of the RSE 104 to acquire the sensor data that is provided by the device sensors 124 of the RSE 104. Upon acquiring the sensor data, the attribute determinant module 206 may utilize sensor logic (not shown) and/or image logic (not shown) to analyze the sensor data and determine the environmental attributes associated with the surrounding environment of the at least one roadway. More specifically, the attribute determinant module 206 may analyze the sensor data using the sensor logic and/or the image logic to determine weather conditions, traffic conditions, and/or infrastructure conditions that are determined based on sensor data provided by the RSE 104.

The attribute determinant module 206 may package each of the determined conditions and may output respective data packages as the environmental attributes associated with the surrounding environment of the at least one roadway. In one configuration, the attribute determinant module 206 may communicate the environmental attributes (data packages) to the roadway behavioral module 208 to process the roadway behavioral data associated with the road user(s) 106, 108, 110 identified as being located within the surrounding environment of the at least one roadway, as discussed below. In some embodiments, the attribute determinant module 206 may store the environmental attributes on the storage unit 120 of the RSE 104 to be further accessed by the RSE 104 to be used for one or more related infrastructure related processes (e.g., to be used for additional traffic related applications, traffic light adjustment, etc.).

The method 400 may proceed to block 404, wherein the method 400 may include receiving sensor data from the RSE 104 that pertains to the at least one road user 106, 108, 110. In one embodiment, upon receiving the geo-location tag(s) associated with the identified road user(s) 106, 108, 110 from the road user identification module 202, the attribute determinant module 206 may be configured to receive sensor data from the RSE 104 based on the birds-eye/overhead view sensing completed by the device sensors 124. The attribute determinant module 206 may analyze the sensor data to determine the road user attributes associated with the road user(s) 106, 108, 110 identified as being located within the surrounding environment of the at least one roadway. In particular, the device sensors 124 of the RSE 104 may output sensor data that may include road user parameters associated with the road user(s) 106, 108, 110 as sensed by the device sensors 124 within the surrounding environment of the at least one roadway.

The method 400 may proceed to block 406, wherein the method 400 may include receiving sensor data from the equipped vehicle(s) 106 and/or the portable device(s) 112 used by the NVRU(s) 110. In one embodiment, the vehicle sensors 132 of the equipped vehicle(s) 106 and/or the device sensors 142 of the portable device(s) 112 may also provide sensor data to the attribute determinant module 206 through the VCD 126 and/or the control unit 138. The sensor data may include road user parameters respectively associated with the equipped vehicle(s) 106 and/or the NVRU(s) 110 that may be further analyzed by the attribute determinant module 206. The sensor data may also include road user parameters associated with the non-equipped vehicle(s) 108 as sensed by the vehicle sensors 132 of the equipped vehicle 106.

The method 400 may proceed to block 408, wherein the method 400 may include aggregating sensor data provided by the RSE 104 and sensor data provided by the equipped vehicle(s) 106 and/or the portable device(s) 112 used by the NVRU(s) 110. In an exemplary embodiment, upon receiving the sensor data output by the device sensors 124 of the RSE 104 and the sensor data output by the vehicle sensors 132 and/or the device sensors 142, the attribute determinant module 206 may aggregate the sensor data provided by the RSE 104, the equipped vehicle(s) 106, and/or the portable device(s) 112. The aggregation of the sensor data may provide aggregated road user parameters that apply respectively to the road user(s) 106, 108, 110 identified as being located within the surrounding environment of the at least one roadway.

The method 400 may proceed to block 410, wherein the method 400 may include evaluating the aggregated sensor data to determine road user attributes associated with the at least one road user 106, 108, 110. Upon aggregating the sensor data (at block 408), the attribute determinant module 206 may utilize sensor logic (not shown) and/or image logic (not shown) to analyze the aggregated sensor data and determine the road user attributes associated with the road user(s) 106, 108, 110 identified as being located within the surrounding environment of the at least one roadway. More specifically, the attribute determinant module 206 may analyze the aggregated sensor data using the sensor logic and/or the image logic to determine positional parameters, directional parameters, and/or dynamic parameters that apply to the road user(s) 106, 108, 110 that are based on the aggregated sensor data. The attribute determinant module 206 may package each of the determined parameters and may output respective data packages that include the road user attributes associated with the respective road user(s) 106, 108, 110 identified as being located within the surrounding environment of the at least one roadway. In one configuration, the attribute determinant module 206 may communicate the road user attributes (data packages) to the roadway behavioral module 208 to process the roadway behavioral data that is associated with the road user(s) 106, 108, 110 identified within the surrounding environment of the at least one roadway, as discussed below.

The method 400 may proceed to block 412, wherein the method 400 may include storing the road user attributes associated with the at least one road user 106, 108, 110 and the environmental attributes associated with the surrounding environment of the at least one roadway. In an exemplary embodiment, upon determining the environmental attributes associated with the surrounding environment of the at least one roadway (at block 402), the attribute determinant module 206 may store the environmental attributes. The environmental attributes may be stored as an aggregated data package that includes data pertaining to weather conditions, traffic conditions, and/or infrastructure conditions occurring at the surrounding environment of the at least one roadway.

Additionally, upon determining the roadway attributes associated with the road user(s) 106, 108, 110 (at block 410), the attribute determinant module 206 may store the road user attributes. The road users attributes may be stored as an aggregated data package that includes data pertaining to positional parameters, directional parameters, and/or dynamic parameters associated with the respective road user(s) 106, 108, 110 identified as being located within the surrounding environment of the at least one roadway. More specifically, the attribute determinant module 206 may access one or more of the storage units 120, 130, 140 and may store the road user attributes and the environmental attributes to be accessed by one or more components of the RSE 104, the equipped vehicle(s) 106, and/or the portable device(s) 112. As discussed below, in one embodiment, the roadway behavioral module 208 may access one or more of the storage units 120, 130, 140 to acquire the roadway related data and the road user related data to process the roadway behavioral data associated with the road user(s) 106, 108, 110 identified as being located within the surrounding environment of the at least one roadway.

Figure 5:
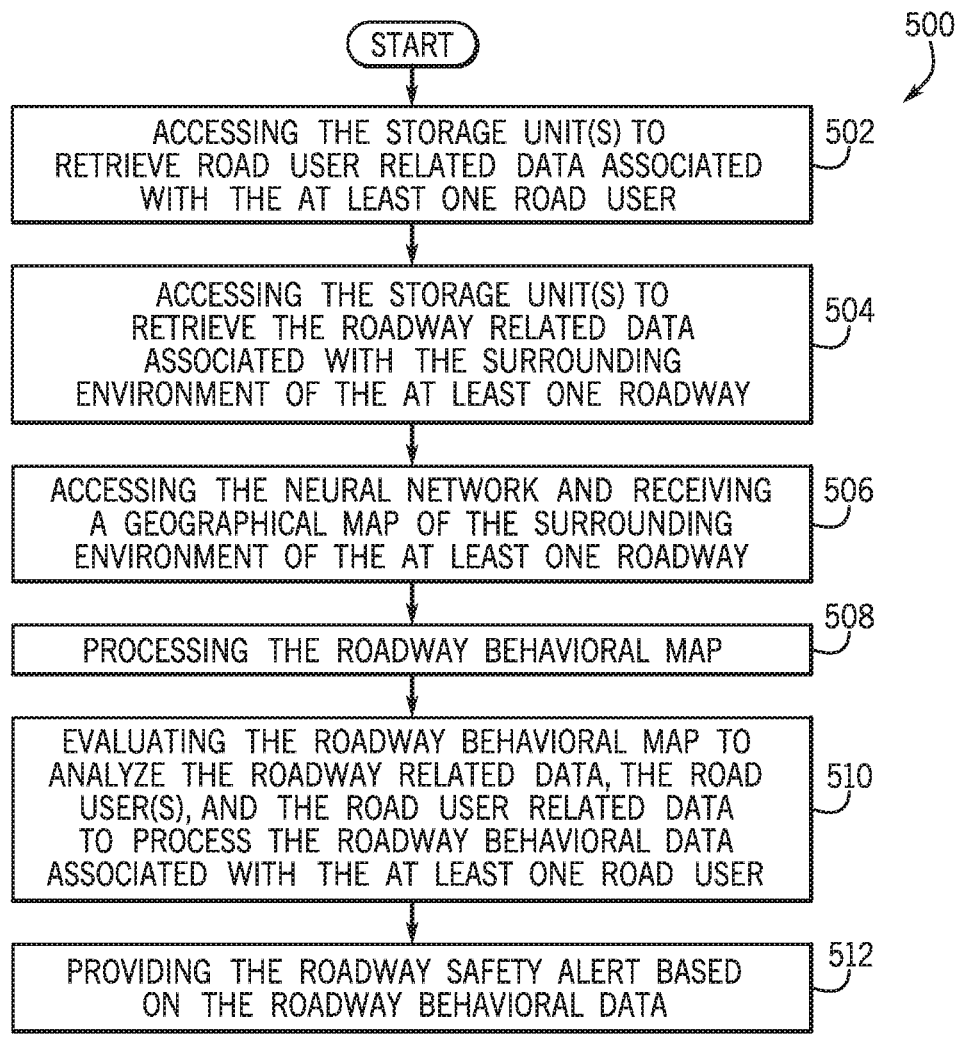
FIG. 5 is a process flow diagram of a method for processing a roadway behavioral data and providing the roadway safety alert according to an exemplary embodiment.

FIG. 5 is a process flow diagram of a method 500 for processing the roadway behavioral data and providing the roadway safety alert according to an exemplary embodiment. FIG. 5 will be described with reference to the components of FIG. 1 and FIG. 2, though it is to be appreciated that the method 500 of FIG. 5 may be used with other system and/or components. The method 500 may begin at block 502, wherein the method 500 may include accessing the storage unit(s) 120, 130, 140 to retrieve the road user related data associated with the at least one road user 106, 108, 110.

As discussed above, upon determining the classification of the at least one road users 106, 108, 110, the road user classification module 204 may store the classification associated with the at least one road user 106, 108, 110 on one or more of the storage units 120, 130, 140 (at block 314 of the method 300). Additionally, as discussed upon determining the road user attributes associated with the at least one road user 106, 108, 110, the attribute determinant module 206 may store the road user attributes associated with the at least one road user 106, 108, 110 on one or more of the storage units 120, 130, 140 (at block 412 of the method 400). In one embodiment, the roadway behavioral module 208 may access one or more of the storage units 120, 130, 140 to retrieve the road user related data. More specifically, the roadway behavioral module 208 may retrieve the classification(s) and the road user attributes associated with the road user(s) 106, 108, 110 identified as being located within the surrounding environment of the at least one roadway.

The method 500 may proceed to block 504, wherein the method 500 may include accessing the storage unit(s) 120, 130, 140 to retrieve the roadway related data associated with the surrounding environment of the at least one roadway. As discussed above, upon determining the environmental attributes associated with the surrounding environment of the at least one roadway, the attribute determinant module 206 may store the environmental attributes associated with the surrounding environment of the at least one roadway on one or more of the storage units 120, 130, 140 (at block 314 of the method 300). In one embodiment, the roadway behavioral module 208 may access one or more of the storage units 120, 130, 140 to retrieve the roadway related data. More specifically, the roadway behavioral module 208 may retrieve the environmental attributes associated with the surrounding environment of the at least one roadway.

The method 500 may proceed to block 506, wherein the method 500 may include accessing the neural network 116 and receiving a geographical map of the surrounding environment of the at least one roadway. In one embodiment, the roadway behavioral module 208 may access the neural network 116 to acquire the roadway map data included within the neural network deep learning database 148 or accessed by the neural network 116. As discussed above, the roadway map data may include the geographical map and satellite/aerial imagery of the surrounding environment of the at least one roadway at which the roadway infrastructure 102 is located. Upon retrieving the roadmap data, the roadway behavioral module 208 may extract the geographic map of the surrounding environment of the at least one roadway from the roadmap data. The geographic map of the surrounding environment of the at least one roadway may include a birds-eye/overhead view of the surrounding environment of the at least one roadway.

The method 500 may proceed to block 508, wherein the method 500 may include processing the roadway behavioral map. In an exemplary embodiment, the roadway behavioral module 208 may analyze the road user related data (retrieved at block 502) and the roadway related data (retrieved at block 504) to process the roadway behavioral map. In one embodiment, the roadway behavioral module 208 may augment the geographical map with the classification and road user attributes associated with the road user(s) 106, 108, 110 identified as being located within the surrounding environment of the at least one roadway. The roadway behavioral module 208 may additionally augment the geographical map with environmental attributes associated with the surrounding environment of the at least one roadway. In particular, the roadway behavioral module 208 may augment the geographical map with one or more classifications, indications, and details associated to each road user(s) 106, 108, 110 that are approaching and/or traveling through the surrounding environment of the at least one roadway based on classifications, positional parameters, directional parameters, and/or dynamical parameters determined by the application 200. The roadway behavioral module 208 may additionally augment the geographical map with infrastructure conditions, traffic conditions, and/or weather conditions included as part of the environmental attributes as determined by the application 200.

In some embodiments, the roadway behavioral module 208 may process the roadway behavioral map by aggregating road user attributes and environmental attributes to augment the geographical map with indications of the road user(s) 106, 108, 110 with associated environmental attributes. For example, the behavioral map may be processed to include the impact of weather conditions and traffic conditions on the speed and directional orientation of the road user(s) 106, 108, 110 within the surrounding environment of roadways that are part of an intersection at which the roadway infrastructure 102 is located.

The method 500 may proceed to block 510, wherein the method 500 includes evaluating the roadway behavioral map to analyze the roadway related data, the road user(s) 106, 108, 110, and the road user related data to process the roadway behavioral data associated with the at least one road user 106, 108, 110. In an exemplary embodiment, upon processing the roadway behavioral map, the roadway behavioral module 208 may further analyze the roadway behavioral map to process the roadway behavioral data associated with the road user(s) 106, 108, 110. More specifically, the roadway behavioral module 208 may analyze roadway related data associated with the surrounding environment of the at least one roadway, the road user(s) 106, 108, 110 indicated within the surrounding environment of the at least one roadway, and the road user related data included within the map. Additionally, the roadway behavioral module 208 may analyze the map and predict the path of travel, rate of travel, direction or travel, and overlap of travel between one or more of the road users 106, 108, 110 located within the surrounding environment of the at least one roadway and may further analyze and predict environmental conditions that may impact the analyzed and predicted paths of travel of the road user(s) 106, 108, 110. This analysis and prediction may be utilized to process the roadway behavioral data that is associated to each respective road user(s) 106, 108, 110 that provides information associated with the road user related data, roadway related data, the analyzed and predicted overlap between the predicted paths of travel of one or more of the road users 106, 108, 110, environmental conditions that may impact one or more of the road users 106, 108, 110, and how such data may affect each of the respective road user(s) 106, 108, 110 located within the surrounding environment of the at least one roadway.

As an illustrative example (not shown), the roadway safety alert module 210 may identify, classify, and determine road user attributes associated with a non-V2V equipped bus and a V2V equipped truck that are traveling during rainy conditions on roadways that are part of a traffic intersection. Based on the processing of the roadway behavioral map and analysis of the map, the roadway behavioral module 208 may analyze and predict a potential overlap between the travel paths of the non-V2V equipped bus and the V2V equipped truck based on the predicted path, rate of travel, direction of travel of the non-V2V equipped bus relative to the predicted path, rate of travel, direction of travel of the V2V equipped truck. Additionally, the roadway safety alert module 210 may determine how the rainy environmental conditions, wet roadway(s) of the intersection, and travel conditions (puddles, traffic) may impact the travel of the non-V2V equipped bus relative to the V2V-equipped truck to process the roadway behavioral data that is associated with the non-V2V equipped bus and is used to provide the roadway safety alert to the V2V-equipped truck. This functionality provides information to a driver of the V2V equipped truck that is associated with the roadway related data associated with the surrounding environment of the roadways traveled by the non-V2V equipped bus and the V2V equipped bus and road user related data associated with the non-V2V equipped bus that is not capable of directly communicating such data to the V2V-equipped truck.

The method 500 may proceed to block 512, wherein the method 500 may include providing the roadway safety alert based on the roadway behavioral data. In an exemplary embodiment, upon processing the roadway behavioral data, the roadway behavioral module 208 may communicate the roadway behavioral data to the roadway safety alert module 210. Upon receiving the roadway behavioral data, the roadway safety alert module 210 may determine a safety alert(s) that is associated to each respective road user(s) 106, 108, 110 that provides information associated with the road user related data and the roadway related data and how such data may affect the respective road user(s) 106, 108, 110 located within the surrounding environment of the at least one roadway. The roadway safety alert module 210 may communicate directly with the equipped vehicle(s) 106 and/or the portable device(s) 112 located within the surrounding environment of the at least one roadway to provide the safety alert to the driver(s) of the equipped vehicle(s) 106 and/or the NVRU(s) 110.

In one embodiment, the roadway safety alert module 210 may provide the roadway safety alert(s) locally within the equipped vehicle(s) 106 based on the communication of respective data by the roadway safety alert module 210 to the VCD 126. The roadway safety alert module 210 may additionally communicate data associated with the roadway safety alert to the control unit 138 of the portable device(s) 112 used by the NVRU(s) 110. In an alternate embodiment, the roadway safety alert module 210 may communicate data associated with the roadway safety alert to the control unit 118 of the RSE 104. The control unit 118 of the RSE 104 may operably control the communication device 122 of the RSE 104 to communicate data associated with the roadway safety alert through the V2I communications protocol and/or one or more wireless communication protocols to the vehicle communication system 150 of the equipped vehicle(s) 106 and/or the device communication system 144 of the portable device(s) 112 to be respectively provided to the VCD 126 and/or the control unit 138.

In one embodiment, upon receipt of the data associated with the roadway safety alert, the VCD 126 may communicate one or more commands to the head unit 128 to actuate the respective display devices to provide the roadway safety alert. Additionally, the VCD 126 may communicate one or more commands to the head unit 128 to actuate the audio devices of the equipped vehicle (s) 106 to provide one or more audio based alerts in accordance with the roadway safety alert. In some embodiments, the roadway safety alert module 210 may also communicate with the VCD 126 to provide one or more haptic based alerts to alert the driver(s) of the equipped vehicle(s) 106 via the haptic devices (e.g., haptic steering wheel, haptic gear shifter) connected to the head unit 128. As discussed, the roadway safety alert may also be implemented by the VCD 126 in the form of the autonomous driving response (e.g., automatic braking) that may be provided to manipulate the operation of the equipped vehicle(s) 106.

In one or more embodiments, upon receipt of the data associated with the roadway safety alert from the roadway safety alert module 210, the control unit 138 may provide the roadway safety alert to alert the NVRU(s) 110 using the portable device(s) 112. The control unit 138 of the portable device(s) 112 may operably control the display screen(s) and/or the speaker(s) to provide the roadway safety alert to thereby alert the NVRU(s) 110 located within the surrounding environment of the at least one roadway. For example, the roadway safety alert may be provided on a wearable device worn by a running pedestrian to alert the running pedestrian of one or more vehicles 106, 108 that are located within the surrounding environment of an intersection proximate to the running pedestrian.

The roadway safety alert(s) may be provided to be specifically applicable to each respective road user(s) 106, 108, 110 identified by the application 200 as being located within the surrounding environment of the at least one roadway. This functionality may ensure that the driver(s) of the equipped vehicle(s) 106 are alerted with respect to the classification(s) and road user attributes of the additional equipped vehicle(s), non-equipped vehicle(s) 108, and/or the NVRU(s) 110 along with environmental attributes associated with the surrounding environment of the at least one roadway. Additionally, this functionality may ensure that the NVRU(s) 110 are alerted with respect to the classification(s) and road user attributes of the equipped vehicle(s) 106 and non-equipped vehicle(s) 108 along with the environmental attributes associated with the surrounding environment of the at least one roadway.

Figure 6:
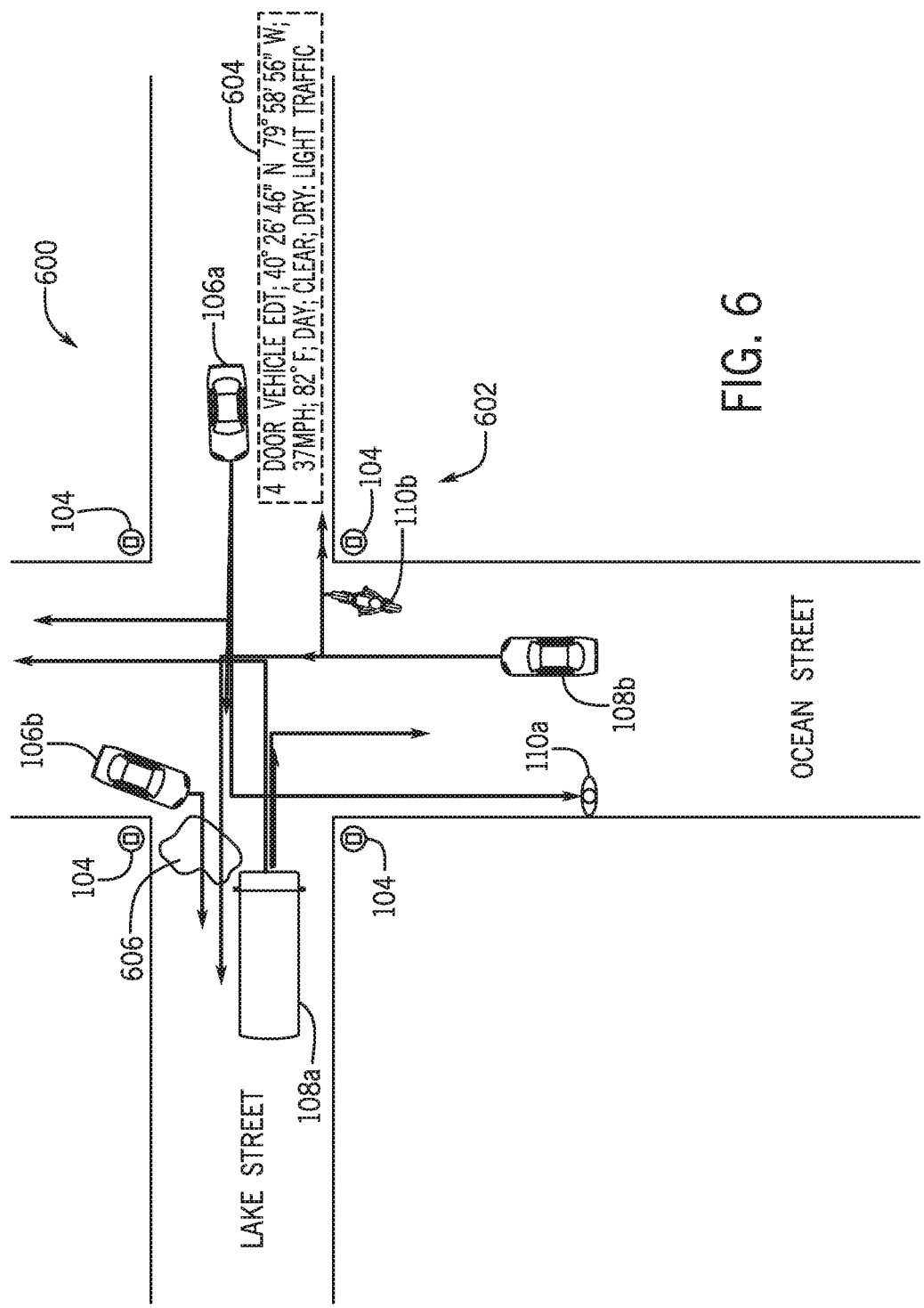
FIG. 6 is an exemplary illustration of a roadway behavioral map processed by a behavioral map processing module of the roadway safety alert application according to an exemplary embodiment.

FIG. 6 is an exemplary illustration of the roadway behavioral map 600 processed by the roadway behavioral module 208 of the roadway safety alert application 200 according to an exemplary embodiment. The roadway behavioral map 600 shown in the illustration of FIG. 6 is presented as a birds-eye/overhead augmented geographical map that includes road user related data and roadway related data presented in a manner in which the road users 106, 108, 110 approach and pass through surrounding environment of roadways (presented as Ocean Street and Lake Street) that are part of an intersection 602.

In one or more embodiments, the roadway behavioral map 600 may present indications of the road users 106, 108, 110 that are indicative of the classification of the road users 106a, 106b, 108a, 108b, 110a, 110b, road user attributes associated with the road users 106a, 106b, 108a, 108b, 110a, 110b, and environmental attributes of the surrounding environment of the roadways that are a part of the intersection 602. As shown in this illustrative example, indications representing the equipped vehicles 106a, 106b may be presented in a manner that are indicative of their associated classifications of a four-door passenger vehicles, as determined by the road user classification module 204. Additionally, the non-equipped vehicle 108a may be represented as a bus that is indicative of the classification associated with the non-equipped vehicle 108a (e.g., city bus) as determined by the road user classification module 204. Similarly, the indications associated with the NVRUs 110a, 110b may respectively be represented as a pedestrian walker and a bicyclist that are indicative of their classifications as determined by the road user classification module 204.

In some embodiments, the roadway behavioral map 600 may include vehicle attributes and environmental attributes in the form of one or more data stamps 604 that may be augmented near one or more respective road users 106a, as shown in the illustrative example. In other embodiments, the data stamp(s) 604 may be provided as a data package that is not shown but is packaged into the roadway behavioral map 600 to be evaluated by the roadway safety alert module 210. For example, as shown, the roadway behavioral module 208 may include a data stamp(s) that may provide road user data and roadway data that pertains to the equipped vehicle 106a.

In some embodiments, the roadway behavioral map 600 may additionally include specific details with respect to environmental conditions that are directly impacting one or more of the road users 106a, 106b, 108a, 108b, 110a, 110b located within the surrounding environment of the intersection 602. As represented, the roadway behavioral module 208 may include a data stamp(s) (not shown) that may provide information that details a puddle 606 that may be included within a travel path of the equipped vehicle 106b and may impact the travel of the equipped vehicle 106a and the non-equipped vehicle 108a located within the surrounding environment of the intersection 602.

As discussed above, in one embodiment, the roadway behavioral module 208 may evaluate the map and may analyze and predict one or more road user travel paths (illustrated by the arrows in FIG. 6) and environmental attributes that may impact the road user(s). More specifically, the roadway behavioral module 208 may predict paths of travel, rate of travel, direction or travel, and overlap of travel between the road users 106a, 106b, 108a, 108b, 110a, 110b located within the surrounding environment of the roadways that are part of the intersection 602 and may further predict environmental conditions that may impact the predicted paths of travel. This determination may be utilized to process the roadway behavioral data associated with each of the road users 106a, 106b, 108a, 108b, 110a, 110b located within the surrounding environment of the roadways that are a part of the intersection 602. The roadway safety alert module 210 may provide the roadway safety alert to each of the road users 106a, 106b, 108a, 108b, 110a, 110b based on the roadway behavioral data respectively associated with each of the road users 106a, 106b, 108a, 108b, 110a, 110b.

Figure 7:
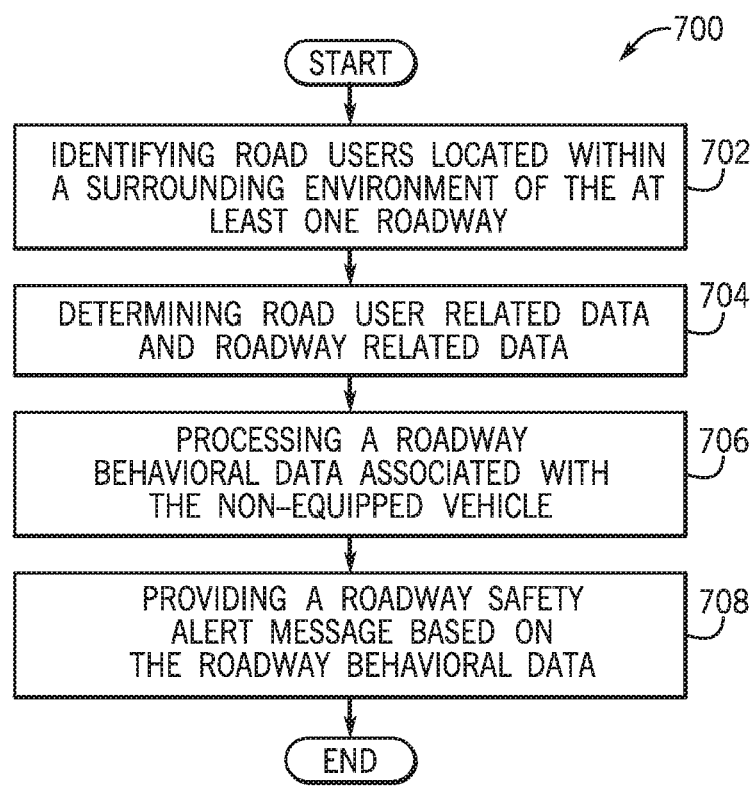
FIG. 7 is a process flow diagram of a method for providing an infrastructure based safety alert associated with at least one roadway according to an exemplary embodiment.

FIG. 7 is a process flow diagram of a method 700 for providing an infrastructure based safety alert associated with at least one roadway according to an exemplary embodiment. FIG. 7 will be described with reference to the components of FIG. 1 and FIG. 2, though it is to be appreciated that the method 700 of FIG. 7 may be used with other system and/or components. The method may begin at block 702, wherein the method 700 may identifying road users 106, 108, 110 located within a surrounding environment of the at least one roadway. As discussed above, the road users 106, 108, 110 may include the equipped vehicle(s) 106, the non-equipped vehicle(s) 108, and/or the NVRU(s) 110.

The method 700 may proceed to block 704, wherein the method 700 may include determining road user related data and roadway related data. In one embodiment, the road user related data is associated with the with non-equipped vehicle(s) 108 and the roadway related data is associated with a birds-eye overhead view of the surrounding environment of the at least one roadway. The method 700 may proceed to block 706, wherein the method 700 may include processing roadway behavioral data associated with the non-equipped vehicle. The roadway behavioral data is based on the road user related data and the roadway related data. The method 700 may proceed to block 708, wherein the method 700 may include providing a roadway safety alert based on the roadway behavioral data. The roadway safety alert is provided to the equipped vehicle(s) 106 to provide information associated with the roadway related data associated with the surrounding environment of the at least one roadway and the road user related data associated with the non-equipped vehicle(s) 108.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing an infrastructure based safety alert associated with at least one roadway, comprising:
    identifying road users located within a surrounding environment of the at least one roadway, wherein the road users include a vehicle communication equipped vehicle (equipped vehicle), a non-communication equipped vehicle (non-equipped vehicle), and a non-vehicular road user utilizing a portable device;
    determining road user related data and roadway related data, wherein the road user related data is based on an aggregation of sensor data provided by the equipped vehicle, sensor data provided by the portable device, and sensor data provided by a road side equipment (RSE) associated with the infrastructure, wherein the road user related data is associated with the non-equipped vehicle and the non-vehicular road user, wherein the roadway related data is associated with a birds-eye overhead view of the surrounding environment of the at least one roadway, wherein the road user related data includes classifications associated with each of the road users, wherein the aggregation of the sensor data provided by the equipped vehicle, the sensor data provided by the portable device, and the sensor data provided by the RSE associated with the infrastructure is analyzed by a neural network to determine the classifications associated with each of the road users that have been previously identified and included within classification data that is accessed and analyzed by the neural network, wherein upon determining that at least one road user has not been previously identified and included within the classification data, the neural network is trained with road user related data that is associated with the at least one road user that has not been previously identified to allow the neural network to update the classification data to determine the classification associated with the at least one road user;
    processing roadway behavioral data associated with the non-equipped vehicle and the non-vehicular road user, wherein the roadway behavioral data is based on the road user related data and the roadway related data, and
    providing a roadway safety alert based on the roadway behavioral data, wherein the roadway safety alert is provided to the equipped vehicle to provide information associated with the roadway related data associated with the surrounding environment of the at least one roadway and the road user related data associated with the non-equipped vehicle and the non-vehicular road user.

2. The computer-implemented method of claim 1, wherein identifying the road users includes receiving sensor data from device sensors of the RSE, vehicle sensors from the equipped vehicle, and device sensors of the portable device, wherein sensor data from the vehicle sensors and sensor data from the device sensors of the portable device are communicated to the RSE, wherein the sensor data from the device sensors of the RSE, the vehicle sensors, and the device sensors of the portable device are analyzed to identify the existence of the road users located within the surrounding environment of the at least one roadway.

3. The computer-implemented method of claim 2, wherein the road user related data includes classifications associated with each of the road users, wherein the sensor data from the RSE that pertains to the road users and the sensor data provided by the portable device is received and analyzed by the neural network to determine the classifications associated with each of the road users, wherein the neural network is trained with road user related data when the classification associated with each of the road users is unknown by updating a neural network deep learning database.

4. The computer-implemented method of claim 3, wherein determining the road user related data includes receiving sensor data from the RSE and sensor data from at least of: the equipped vehicle and the portable device and aggregating the sensor data received from the RSE and the sensor data received from at least one of: the equipped vehicle and the portable device to determine aggregated sensor data.

5. The computer-implemented method of claim 4, wherein determining the road user related data includes evaluating the aggregated sensor data to determine road user attributes included within the road user related data that is associated with each of the road users.

6. The computer-implemented method of claim 4, wherein the roadway related data includes at least one environmental attribute associated with the surrounding environment of the at least one roadway, wherein sensor data received from the RSE is analyzed to determine the at least one environmental attribute associated with the surrounding environment of the at least one roadway.

7. The computer-implemented method of claim 6, wherein processing the roadway behavioral data includes processing a roadway behavioral map of the surrounding environment of the at least one roadway, wherein processing the roadway behavioral map includes augmenting a geographical map of the surrounding environment of the at least one roadway with the road user related data and the roadway related data.

8. The computer-implemented method of claim 7, wherein processing the roadway behavioral data includes analyzing the roadway behavioral map, wherein analyzing the roadway behavioral map includes analyzing the roadway related data and road user related data included within the roadway behavioral map to analyze and predict a path of travel, a rate of travel, a direction of travel, and overlap of travel between the road users located within the surrounding environment of the at least one roadway.

9. The computer-implemented method of claim 1, further including processing roadway behavioral data associated with the non-vehicular road user, wherein the roadway safety alert is provided to the equipped vehicle to provide information associated with the roadway related data associated with the surrounding environment of the at least one roadway and the road user related data associated with the non-vehicular road user.

10. A system for providing an infrastructure based safety alert associated with at least one roadway, comprising:
a memory storing instructions when executed by a processor cause the processor to:
identify road users located within a surrounding environment of the at least one roadway, wherein the road users include a vehicle communication equipped vehicle (equipped vehicle), a non-communication equipped vehicle (non-equipped vehicle), and a non-vehicular road user utilizing a portable device;
determine road user related data and roadway related data, wherein the road user related data is based on an aggregation of sensor data provided by the equipped vehicle, sensor data provided by the portable device, and sensor data provided by a road side equipment (RSE) associated with the infrastructure, wherein the road user related data is associated with the non-equipped vehicle and the non-vehicular road user, wherein the roadway related data is associated with a birds-eye overhead view of the surrounding environment of the at least one roadway, wherein the road user related data includes classifications associated with each of the road users, wherein the aggregation of the sensor data provided by the equipped vehicle, the sensor data provided by the portable device, and the sensor data provided by the RSE associated with the infrastructure is analyzed by a neural network to determine the classifications associated with each of the road users that have been previously identified and included within classification data that is accessed and analyzed by the neural network, wherein upon determining that at least one road user has not been previously identified and included within the classification data, the neural network is trained with road user related data that is associated with the at least one road user that has not been previously identified to allow the neural network to update the classification data to determine the classification associated with the at least one road user;
process roadway behavioral data associated with the non-equipped vehicle and the non-vehicular road user, wherein the roadway behavioral data is based on the road user related data and the roadway related data; and
provide a roadway safety alert based on the roadway behavioral data, wherein the roadway safety alert is provided to the equipped vehicle to provide information associated with the roadway related data associated with the surrounding environment of the at least one roadway and the road user related data associated with the non-equipped vehicle and the non-vehicular road user.

11. The system of claim 10, wherein identifying the road users includes receiving sensor data from device sensors of the RSE, vehicle sensors from the equipped vehicle, and device sensors of the portable device, wherein sensor data from the vehicle sensors and sensor data from the device sensors of the portable device are communicated to the RSE, wherein the sensor data from the device sensors of the RSE, the vehicle sensors, and the device sensors of the portable device are analyzed to identify the existence of the road users located within the surrounding environment of the at least one roadway.

12. The system of claim 11, wherein the road user related data includes classifications associated with each of the road users, wherein the sensor data from the RSE that pertains to the road users and the sensor data provided by the portable device is received and analyzed by the neural network to determine the classifications associated with each of the road users, wherein the neural network is trained with road user related data when the classification associated with each of the road users is unknown by updating a neural network deep learning database.

13. The system of claim 12, wherein determining the road user related data includes receiving sensor data from the RSE and sensor data from at least of: the equipped vehicle and the portable device and aggregating the sensor data received from the RSE and the sensor data received from at least one of: the equipped vehicle and the portable device to determine aggregated sensor data.

14. The system of claim 13, wherein determining the road user related data includes evaluating the aggregated sensor data to determine road user attributes included within the road user related data that is associated with each of the road users.

15. The system of claim 13, wherein the roadway related data includes at least one environmental attribute associated with the surrounding environment of the at least one roadway, wherein sensor data received from the RSE is analyzed to determine the at least one environmental attribute associated with the surrounding environment of the at least one roadway.

16. The system of claim 15, wherein processing the roadway behavioral data includes processing a roadway behavioral map of the surrounding environment of the at least one roadway, wherein processing the roadway behavioral map includes augmenting a geographical map of the surrounding environment of the at least one roadway with the road user related data and the roadway related data.

17. The system of claim 16, wherein processing the roadway behavioral data includes analyzing the roadway behavioral map, wherein analyzing the roadway behavioral map includes analyzing the roadway related data and road user related data included within the roadway behavioral map to analyze and predict a path of travel, a rate of travel, a direction of travel, and overlap of travel between the road users located within the surrounding environment of the at least one roadway.

18. The system of claim 10, further including processing roadway behavioral data associated with the non-vehicular road user, wherein the roadway safety alert is provided to the equipped vehicle to provide information associated with the roadway related data associated with the surrounding environment of the at least one roadway and the road user related data associated with the non-vehicular road user.

19. A non-transitory computer readable storage medium storing instructions that when executed by a computer, which includes a processor, perform a method, the method comprising:
identifying road users located within a surrounding environment of at least one roadway, wherein the road users include a vehicle communication equipped vehicle (equipped vehicle), a non-communication equipped vehicle (non-equipped vehicle), and a non-vehicular road user utilizing a portable device;

determining road user related data and roadway related data, wherein the road user related data is based on an aggregation of sensor data provided by the equipped vehicle, sensor data provided by the portable device, and sensor data provided by a road side equipment (RSE) associated with infrastructure, wherein the road user related data is associated with the non-equipped vehicle and the non-vehicular road user, wherein the roadway related data is associated with a birds-eye overhead view of the surrounding environment of the at least one roadway, wherein the road user related data includes classifications associated with each of the road users, wherein the aggregation of the sensor data provided by the equipped vehicle, the sensor data provided by the portable device, and the sensor data provided by the RSE associated with the infrastructure is analyzed by a neural network to determine the classifications associated with each of the road users that have been previously identified and included within classification data that is accessed and analyzed by the neural network, wherein upon determining that at least one road user has not been previously identified and included within the classification data, the neural network is trained with road user related data that is associated with the at least one road user that has not been previously identified to allow the neural network to update the classification data to determine the classification associated with the at least one road user;

processing roadway behavioral data associated with the non-equipped vehicle and the non-vehicular road user, wherein the roadway behavioral data is based on the road user related data and the roadway related data, and providing a roadway safety alert based on the roadway behavioral data, wherein the roadway safety alert is provided to the equipped vehicle to provide information associated with the roadway related data associated with the surrounding environment of the at least one roadway and the road user related data associated with the non-equipped vehicle and the non-vehicular road user.

20. The non-transitory computer readable storage medium of claim 19, further including processing roadway behavioral data associated with the non-vehicular road user, wherein the roadway safety alert is provided to the equipped vehicle to provide information associated with the roadway related data associated with the surrounding environment of the at least one roadway and the road user related data associated with the non-vehicular road user.

* * * * *